US011297030B2

(12) United States Patent
Oliner et al.

(10) Patent No.: US 11,297,030 B2
(45) Date of Patent: Apr. 5, 2022

(54) EMBEDDINGS-BASED DISCOVERY AND EXPOSURE OF COMMUNICATION PLATFORM FEATURES

(71) Applicant: Slack Technologies, Inc., San Francisco, CA (US)

(72) Inventors: Adam Oliner, San Francisco, CA (US); Renaud Bourassa-Denis, New York, NY (US); Zhifeng Deng, Fremont, CA (US); Leigh Ann Johnson, San Francisco, CA (US); Alexander Nicholas Johnson, San Francisco, CA (US); Aaron Maurer, New York, NY (US)

(73) Assignee: Slack Technologies, LLC, San Francisco, CA (US)

( * ) Notice: Subject to any disclaimer, the term of this patent is extended or adjusted under 35 U.S.C. 154(b) by 99 days.

(21) Appl. No.: 16/888,315

(22) Filed: May 29, 2020

(65) Prior Publication Data

US 2021/0352039 A1    Nov. 11, 2021

Related U.S. Application Data

(63) Continuation of application No. 16/875,933, filed on May 15, 2020.
(Continued)

(51) Int. Cl.
*H04L 12/58* (2006.01)
*H04L 51/56* (2022.01)
(Continued)

(52) U.S. Cl.
CPC .......... *H04L 51/36* (2013.01); *G06F 16/9535* (2019.01); *G06F 16/9538* (2019.01)

(58) Field of Classification Search
CPC ............. G06F 16/9535; G06F 16/9538; G06F 16/2272; G06F 21/6218; G06F 21/6263;
(Continued)

(56) References Cited

U.S. PATENT DOCUMENTS

| 10,547,571 B2 | 1/2020 | Joe et al. |
| 2006/0106767 A1 | 5/2006 | Adcock et al. |

(Continued)

OTHER PUBLICATIONS

David Auberbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM) 8 pages.
(Continued)

*Primary Examiner* — Le H Luu
(74) *Attorney, Agent, or Firm* — Lee & Hayes, P.C.

(57) ABSTRACT

Discovery of communication platform features or exposure of such features to the user may include generating embeddings for a variety of types of communication platform content and communications. These embeddings may be used to characterize and compare various communication platform features and ultimately expose these features to a user when the user may not have otherwise encountered them. Embeddings may be generated to characterize a user's interactions with a communication platform and/or characterize a channel and the embeddings may be used to expose methods of communicating with the user and/or over the channel.

20 Claims, 8 Drawing Sheets

Related U.S. Application Data

(60) Provisional application No. 63/022,518, filed on May 10, 2020.

(51) Int. Cl.
  *G06F 16/9535* (2019.01)
  *G06F 16/9538* (2019.01)

(58) Field of Classification Search
  CPC ... H04L 51/36; H04L 41/0233; G06K 9/6219; G06K 9/66; G06N 3/0445; G06N 3/08; G06Q 30/0204; H04W 4/12
  See application file for complete search history.

(56) References Cited

U.S. PATENT DOCUMENTS

| | | |
|---|---|---|
| 2016/0048556 A1 | 2/2016 | Kelly et al. |
| 2017/0054587 A1* | 2/2017 | Wade ................. H04L 41/0233 |
| 2018/0032585 A1 | 2/2018 | Kadiyala |
| 2018/0121827 A1 | 5/2018 | Green |
| 2018/0218382 A1* | 8/2018 | Ye ...................... G06Q 30/0204 |
| 2018/0285700 A1* | 10/2018 | Stoop ....................... G06K 9/66 |
| 2018/0287982 A1 | 10/2018 | Draeger et al. |
| 2018/0376185 A1* | 12/2018 | Lonstein ................. H04W 4/12 |
| 2019/0294999 A1* | 9/2019 | Guttmann ............ G06K 9/6219 |
| 2020/0053223 A1 | 2/2020 | Lu et al. |
| 2020/0192881 A1* | 6/2020 | Largman ............. G06F 16/2272 |
| 2020/0220741 A1 | 7/2020 | Sai et al. |
| 2020/0336501 A1* | 10/2020 | Lewis ................. G06F 21/6263 |
| 2020/0349226 A1* | 11/2020 | Ristoski ................... G06N 3/08 |
| 2020/0364507 A1* | 11/2020 | Berry ................... G06N 3/0445 |
| 2020/0380311 A1* | 12/2020 | Lourentzou .............. G06N 3/08 |
| 2021/0051121 A1 | 2/2021 | Menon et al. |
| 2021/0073336 A1 | 3/2021 | Fox et al. |
| 2021/0303716 A1* | 9/2021 | Janakiraman ....... G06F 21/6218 |

OTHER PUBLICATIONS

Michael Carney, "Slack is thriving on a cocktail of whimsy and great timing", Pandodaily, LexisNexis, https://advance.lexis.com/api/permalink/dd2d4ee5-2ddf-4d3a-a1d9-3bcee5e38b74/?context=1000516, (dated Feb. 6, 2015, 2:12 AM) 4 pages.

"Die, Email, Die! A Flickr Cofounder Aims to Cut Us All Some Slack", Readwriteweb, LexisNexis, https://advance.lexis.com/api/permalink/33dd79e2-90f5-409d-ae27-5a2c7e86bf31/?context=1000516>. (dated Aug. 14, 2013, 4:15 PM) 3 pages.

Robert Hof, "Stewart Butterfield on How Slack Became A $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.

Matthew Ingram, "Flickr co-founder launches Slack, an all-in-one messaging tool designed to kill email forever", Gigaom, LexisNexis, https://advance.lexis.com/api/permalink/0b676b7c-aec3-4560-861e-d030d1dd008c/?context=1000516, (dated Feb. 12, 2014, 7:03 PM), 3 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 21 pages.

Mike Issac, "Slack, a Start-Up With an App to Foster Business Collaboration, Is Valued at $1.1 Billion", The New York Times Blogs (Bits), LexisNexis, https://advance.lexis.com/api/permalink/3eb84b34-a8f9-4d7d-9573-89d9598a4963/?context=1000516>. (dated Oct. 31, 2014) 3 pages.

Adrienne LaFrance, "The Triumph of Email", Atlantic Online, LexisNexis, https://advance.lexis.com/api/permalink/32d7ddd9-d4c1-4a73-86f7-08ab5842fde6/?context=1000516, (dated Jan. 6, 2016) 6 pages.

Matsumoto, T. et al., "Chocoa Communicator—A New Communication System Based on Awareness and Text Communications", Fujitsu Sci. Tech. J., 36, 2, (Dec. 2000) pp. 154-161.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

Ernie Smith, "Picking Up The Slack", Tedium, [online][retrieved May 9, 2019]. Retrieved from the Internet: <URL: https://tedium.co/2017/10/17/irc-vs-slack-chat-history/>. (dated Oct. 17, 2017) 8 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.

Jonathan Vanian, "Why these startups think chat apps are the next big thing in workplace collaboration", Gigaom, LexisNexis, https://advance.lexis.com/api/permalink/e83//8c8-09c8-43aa-9ba0-88526283de69/?context= 1000516, (dated Aug. 1, 2014, 5:45 PM) 4 pages.

Rebecca Walberg, "Email biggest office waste of time: survey", National Post, at FP10, LexisNexis, https://advance.lexis.com/api/permalink/96268e3f-26ad-48ac-a98f-6c39804ebded/?context=1000516, (dated Mar. 4, 2014) 3 pages.

Office Action for U.S. Appl. No. 16/875,933, dated Jan. 24, 2022, Oliner, "Embeddings-Based Discovery and Exposure of Communication Platform Features", 18 pages.

* cited by examiner

EMBEDDINGS-BASED DISCOVERY AND EXPOSURE OF COMMUNICATION PLATFORM FEATURES

RELATED MATTERS

This application is a continuation of U.S. patent application Ser. No. 16/875,933, filed May 15, 2020, which claims the benefit of U.S. Provisional Application No. 63/022,518, filed May 10, 2020.

TECHNICAL FIELD

Individuals and various institutions, such as businesses, schools, and clubs, increasingly rely on sophisticated communication platforms to facilitate efficient task-related communications. Because of the increased volume of use of such platforms, content and communications available on such a communication platform may be increasingly redundant and difficult to find without sophisticated experience with the platform or long-standing familiarity with the organization's use of the platform.

Additionally, some users may be members of multiple organizations that use the communication platform. Even though a long-standing user may be very familiar with one organization's use of a communication platform, the user may find that another organization uses the communication platform in a very different manner, preventing the long-standing user from encountering the features the user needs and/or causing the user to create redundant content and/or communications, further exacerbating the issue. Moreover, very few, if any users, spend time cleaning up unused or redundant channels and/or familiarizing themselves with features of the communication platform outside of the most basic functions, thereby reducing the effectiveness of the communication platform.

Ultimately, these issues may cause a communication platform to become more of a burden for users than an effective tool and may cause multiple technical issues, such as clogging computer memory because of redundant content, congesting network bandwidth, and/or using up server or cloud service compute cycles.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 7B additionally illustrates clusters determined based thereon.

FIG. 7D additionally illustrates clusters determined based thereon.

DETAILED DESCRIPTION

Figure 1:
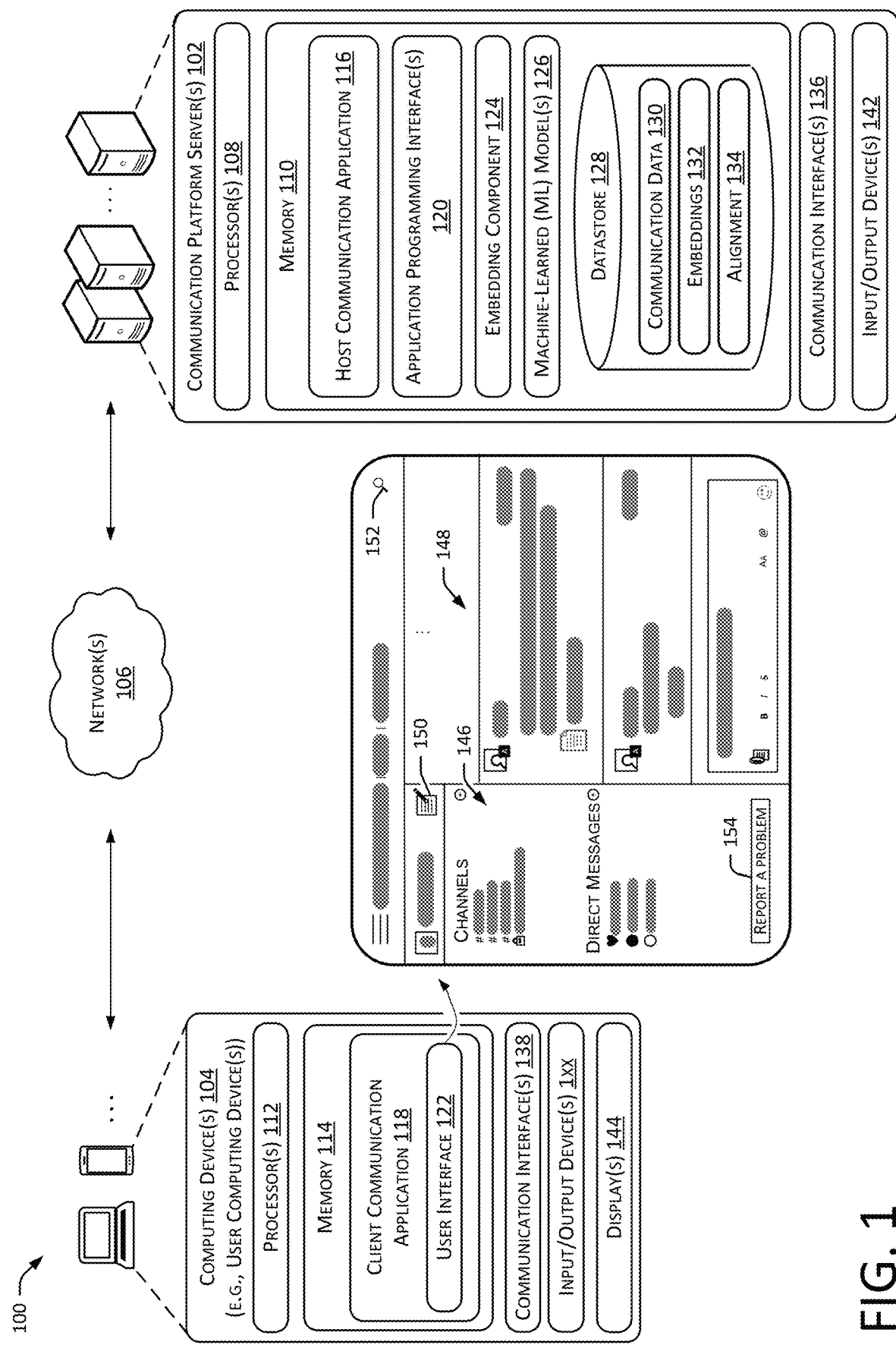
FIG. 1 illustrates a block diagram illustrating an example system of computing devices usable to implement example techniques described herein.

The techniques discussed herein include machines and processes for facilitating user discovery of communication platform features or exposing such features to the user. The techniques include generating embeddings for a variety of types of communication platform content and communications, collectively referred to herein as communication data. These embeddings may be used to characterize and compare various communication platform features and ultimately expose these features to a user when the user may not have otherwise encountered them (e.g., through a keyword search, by continuing to use the communication platform according to the user's knowledge of the platform or of the organization's use of the platform). In some examples, the communication platform is a channel-based messaging platform.

The techniques may comprise an embedding algorithm that may receive communication data as input and may transform that input into a location in an embedding space, which may be a high dimension space. For example, the embedding space may be 32-dimensional, 256-dimensional, 512-dimensional, or more-dimensional space, although it is also contemplated that the embedding space may have less dimensions. The embedding algorithm is designed to assign locations in the embedding space based on the similarity (or dissimilarity) of the input to previous inputs. For example, the embedding algorithm may receive the sentence "We received the shipment" and map that sentence to a location, assigning the sentence a vector representing that location in the embedding space. That location/vector is referred to herein as an embedding. The embedding for "We received the shipment" might be near to an embedding of a channel devoted to discussing shipments or an embedding that represents a user of the communication platform that regularly discusses shipping, although the embedding may be a little further from a spreadsheet listing the expenditures associated with a group of orders, and much further from an embedding associated with a cat video.

Upon receiving new communication data (e.g., a new message, message draft, query, file, or the like), the techniques may include generating a new embedding associated therewith and the techniques may include exposing one or more features of the communication platform based on comparing the new embedding to previously generated embeddings. Comparing the embeddings in this manner may provide a technical method for determining semantic similarity between the same or different data types and may be used in addition to or instead of other techniques, such as keyword or Boolean operator based searching. Feature exposure may comprise providing semantic search results that are based on the embeddings; identifying tickets that are similar to a triage ticket that has recently been received; indicating an application, user, channel, or a file that may be relevant to a user based on a message or query the user has entered, and/or the like; determining whether conversation in a channel has diverging topics and providing a suggestion to split the channel or vice versa (e.g., merging two formerly separate channels that begin to include converging communication data).

Additionally or alternatively, the techniques may comprise determining an alignment (e.g., a degree of similarity and/or density of embeddings associated with a channel, workspace or organization) and splitting a channel (e.g., creating at least two channels from a single former channel), migrating one or more members of a channel to a different channel, and/or migrating a channel from a first workspace (e.g., collection of channels, such as may be associated with a particular group within an organization—e.g., the finance group, operations, engineering, or any more or less granular breakdown) if the alignment decreases/diverges.

The techniques described herein may enhance users' ability find communications and/or content stored on the communication platform, even if a user does not use search terms that match the communications or content for which they're searching and even when a user may be unfamiliar with search techniques or the communication platform itself. Moreover, the techniques may enhance the user experience by ensuring that communication data of a similar type can reliably be found in a same place in the communication platform, even though not all individuals will use the communication platform in the same manner (e.g., thinking to organize the communication platform in a certain way, use certain tools in certain channels, use particular channels for a same topic) and a same individual may not even use the communication platform consistently. Continuity of the organization of the communications and/or content and means by which a user can retrieve or discover communication data is critical to efficient communication and making progress on deliverables—the techniques described herein increase the continuity of the organization of the communication data and the means by which such data is retrieved. Moreover, the techniques discussed herein may reduce or eradicate the need to inform, coordinate, or moderate user submissions via the communication platform to preserve the consistency of the communication data.

The techniques described herein may improve performance of a user computing device by reducing the amount of content downloaded to the user computing device in association with a local communication application associated with the communication platform. For example, the techniques may include methods for exposing communication data that already exists on the communication platform and/or merging channels, which may prevent a user from redundantly creating communication data, which may also reduce network bandwidth, storage use at the communication platform server(s), and/or computing cycles on both the user end and server end. For example, the techniques described herein improve performance of one or more computing devices by reducing an amount of content sent over a network, which may improve transmitting, intervening, and receiving computing devices. By exposing existing communication data and reducing redundant communication data, the techniques may also improve the user experience and the usefulness of the communication platform for making tangible progress on various projects and deliverables since communication features are exposed when they're needed and channels may not be cluttered with communication data that is relevant to a different project than a project for which a channel or workspace is defined.

Furthermore, the techniques described herein may improve the privacy and security associated with the communication data since the embedding algorithm may be lossy, which may reduce the likelihood that an attacker could discover the plain text from the embedding that was generated in association with the text. Moreover, some of the techniques discussed herein comprise aggregating embeddings and choosing a representative embedding (e.g., an average embedding location or an embedding region) from the aggregated embeddings, which may introduce a further layer of security. For example, the embedding algorithm may generate an embedding from a message sent in a channel and may do so for a thousand other messages in the channel. The techniques discussed herein may comprise aggregating those embeddings associated with the messages of the channel, such as determining cluster(s) associated with the embeddings, and determining one or more representative embeddings that may be associated with the channel. It may be impossible to reverse the content of one of the messages from a representative embedding that indicates an average location or a region of the embedding space associated with the channel. Regardless, the embeddings may be stored in secure storage on the communication platform server(s) in at least one instance and may not be pushed to a user computing device, although in an alternate example, an encrypted version of an embedding may be provided to a user computing device.

These and other aspects are described further below with reference to the accompanying drawings. The drawings are merely example implementations and should not be construed to limit the scope of the claims. For example, while some examples are illustrated in the context of a user interface for a mobile device, the same or similar techniques may be implemented using any computing device and the user interface may be adapted to the size, shape, and configuration of the particular computing device.

Example System(s)

FIG. 1 illustrates a block diagram illustrating an example system 100 of computing devices usable to implement example techniques described herein. In at least one example, the example system 100 can be associated with a communication platform that can leverage a network-based computing system to enable users of the communication platform to exchange data. In at least one example, the communication platform can be "group-based" such that the platform, and associated systems, communication channels, messages, and/or virtual spaces, have security (that can be defined by permissions) to limit access to a defined group of users. In some examples, such groups of users can be defined by group identifies, as described above, which can be associated with common access credentials, domains, or the like. In some examples, the communication platform can be a hub, offering a secure and private virtual space to enable users to chat, meet, call, collaborate, or otherwise communicate between or among each other. As described above, each group can be associated with a workspace, enabling users associated with the group to chat, meet, call, collaborate, or otherwise communicate between or among each other in a secure and private virtual space. In some examples, the communication platform is a channel-based messaging platform—in other words, channels of the communication platform may be central component of the manner of communicating and providing content via the communication platform. In some examples, members of a group, and thus workspace, can be associated with a same organization. In some examples, members of a group, and thus workspace, can be associated with different organizations (e.g., entities with different organization identifiers).

FIG. 1 illustrates example system 100 as comprising example computing devices including communication platform server(s) 102 and one or more computing devices 104 (e.g., user computing device(s)) associated with a first user, that interact over a network 106. By way of example and not limitation, the communication platform server(s) 102 may be representative of servers used to implement a communication platform system, the first computing device(s) 104 may be representative of user device(s) associated with a first user. The user computing device(s) 104 may be any suitable type of computing device, e.g., portable, semi-portable, semi-stationary, or stationary. Some examples of the user computing device(s) 104 can include a tablet computing device, a smart phone, a mobile communication device, a laptop, a netbook, a desktop computing device, a terminal computing device, a wearable computing device, an augmented reality device, an Internet of Things (IOT) device, or any other computing device capable of sending communications and performing the functions according to the techniques described herein.

In at least one example, the example system 100 can be associated with a communication platform that can leverage a network-based computing system to enable users of the communication platform to exchange data. In at least one example, the communication platform can be "group-based" such that the platform, and associated systems, communication channels, messages, and/or virtual spaces, have security (that can be defined by permissions) to limit access to a defined group of users. In some examples, such groups of users can be defined by group identifies, as described above, which can be associated with common access credentials, domains, or the like. In some examples, the communication platform can be a hub, offering a secure and private virtual space to enable users to chat, meet, call, collaborate, or otherwise communicate between or among each other. As described above, each group can be associated with a workspace, enabling users associated with the group to chat, meet, call, collaborate, or otherwise communicate between or among each other in a secure and private virtual space. In some examples, members of a group, and thus workspace, can be associated with a same organization. In some examples, members of a group, and thus workspace, can be associated with different organizations (e.g., entities with different organization identifiers).

The communication platform server(s) 102 may comprise one or more individual servers or other computing devices that may be physically located in a single central location or may be distributed at multiple different locations. The communication platform server(s) 102 may be hosted privately by an entity administering all or part of the communications network (e.g., a utility company, a governmental body, distributor, a retailer, manufacturer, etc.), or may be hosted in a cloud environment, or a combination of privately hosted and cloud hosted services.

The network(s) 106 can include, but are not limited to, any type of network known in the art, such as a local area network or a wide area network, the Internet, a wireless network, a cellular network, a local wireless network, Wi-Fi and/or close-range wireless communications, Bluetooth®, Bluetooth Low Energy (BLE), Near Field Communication (NFC), a wired network, or any other such network, or any combination thereof. The network(s) 106 may comprise a single network or collection of networks, such as the Internet, a corporate intranet, a virtual private network (VPN), a local area network (LAN), a wireless local area network (WLAN), a cellular network, a wide area network (WAN), a metropolitan area network (MAN), or a combination of two or more such networks, over which the user computing device(s) 104 may access the communication platform and/or communicate with other user computing device(s) via the communication platform. Components used for such communications can depend at least in part upon the type of network, the environment selected, or both. Protocols for communicating over such network(s) 106 are well known and are not discussed herein in detail.

Each of the computing devices described herein may include one or more processors and/or memory. Specifically, in the illustrated example, communication platform server(s) 102 include one or more processors 108 and memory 110 and computing device(s) 104 include one or more processors 112 and memory 114. By way of example and not limitation, the processor(s) may comprise one or more central processing units (CPUs), graphics processing units (GPUs), field-programmable gate arrays (FPGAs), and/or process-acceleration devices such as application-specific integrated circuits (ASICs) or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

The memory may comprise one or more non-transitory computer-readable media and may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/flash-type memory, or any other type of memory capable of storing information. The architectures, systems, and individual elements described herein may include many other logical, programmatic, and physical components, of which those shown in the accompanying figures are merely examples that are related to the discussion herein. The computer-readable memories 110 and 114 can be used to store any number of functional components that are executable by the processor(s) 108 and/or 112, respectively. In many implementations, these functional components comprise instructions or programs that are executable by the processor(s) 108 and/or 112 and that, when executed, specifically configure the processor(s) 108 and/or 112 to perform the actions attributed to the server(s) 102 and/or the computing device(s) 104, according to the discussion herein.

As shown in FIG. 1, communication platform server(s) 102 include a host communication application 116 and computing device(s) 104 includes client communication application 118 that enables interaction of content via the communication platform server(s) 102 among one or more computing devices associated via the communication platform. For example, content (e.g., messages including text, images, audio, video, etc.) can be shared among users associated with user accounts of an online communication network provided by the communication platform system and may include sharing content in accordance with a user account that is restricted, such as based on a type of account; an organization associated with the user/an organization account that has authorized access of the communication platform via the organization's account; a workspace that the user has joined or to which the user was added, or the like. In some examples, the communication client application enables interfaces to access content, to view content, and to generate content as those described with reference to FIGS. 2-8 for example. In particular examples, communication platform server(s) 102 send instructions to present, transmit, and receive content and/or instructions as discussed with reference to FIGS. 2-8. In some examples, the communication platform server(s) 102 may expose interface options that are unique to the techniques discussed herein and, in some cases, may not be otherwise available to a user, although, in other examples, the user may access the interface options through a traditional manner of using the communication platform.

In some examples, the communication platform can be a channel-based messaging platform, that in some examples, can be usable by group(s) of users. Users of the communication platform can communicate with other users via communication channels. A communication channel, or virtual space, can be a data route used for exchanging data between and among systems and devices associated with the communication platform. In at least one example, the host communication application 116 can establish a communication channel between and among various user computing devices, allowing the user computing devices to communicate and share data between and among each other. In at least one example, the communication application 116 can manage such communications and/or sharing of data. In some examples, data associated with a communication channel can be presented via a user interface. In at least one example, the host communication application 116 can interact with the computing device(s) 104 via one or more application programing interface (API(s)) 120 to manage the generation, presentation, and/or updating of user interfaces.

In at least one example, the host communication application 116 and/or client communication application 118 can be a mobile application, a web application, a database interface (e.g., such as an application that presents a SQL or other database interface), or a desktop application, which can be provided by the communication platform or which can be an otherwise dedicated application.

In some examples, the host communication application 116 may differ from the client communication application 118 by including or accessing one or more application programming interface(s) (API(s)) 120 for exposing backend functions offered by the communication platform server(s) 102 to the computing device(s) 104 without transferring the functions to the computing device(s) 104 and/or accomplishing the functions at the communication platform server(s) 102. As relates to the instant discussion, this may comprise API(s) for receiving communication data from the computing device(s) 104, such as a message or any of the communication data discussed herein, and determining an embedding, identifying one or more nearest neighbors based at least in part on the techniques discussed herein, and returning an indication of one or more communication platform features or instructions associated therewith (e.g., instructions to cause a user interface 122 associated with the client communication application 118 to display an option to populate a channel or user identifier for the message that triggered the API call).

In some examples, the client communication application 118 may comprise an instruction to a call an API in the examples discussed herein. For example, if a user starts to compose a new message without specifying a channel over which to transmit the new message or types in a search query, the client communication application 118 may transmit (via network(s) 106) an API call and the draft message or the search query to the host communication application 116 to the embedding component 124 at communication platform server(s) 102.

FIG. 1 further illustrates communication platform server(s) 102 as including embedding component 124 and machine-learned (ML) model 126, which may carry out at least some of the operations discussed herein. In at least one, the ML model 126 may additionally or alternatively be stored in memory 114 of the computing device(s) 104. The communication platform server(s) 102 may additionally or alternatively include or have access to datastore 128. In at least one example, a datastore 128 can be configured to store data that is accessible, manageable, and updatable, such as communication data 130. In some examples, any content or communications that are transmitted via the communication platform may be stored in datastore 128 until deletion therefrom. In some examples, the datastore 128 can be integrated with the server(s) 102, as shown in FIG. 1. In other examples, the datastore 128 can be located remotely from the server(s) 102 and can be accessible to the server(s) 102 and/or user device(s), such as the user device(s) 104. The datastore 128 may comprise multiple databases, which can include communication data 130, embeddings 132, and/or alignment(s) 134, although the datastore 128 may store additional or alternative data.

Communication data 130 may include a message, query, file (e.g., document, spreadsheet, computer code, image, video, audio, electronic contact information), mention, user or user profile, interaction (e.g., reaction, edit, deletion, prioritization such as by pinning or starring), ticket, channel, application integrated into one or more channels, conversation (e.g., group of messages that has been segmented as a single unit), workspace (e.g., a set of channels, users, projects, tasks within an organization that may have its own set of permissions; may be organized substantially in line with an organization chart in some instances), etc. that are associated with an organization's transmissions using the communication platform In some examples, the communication data 130 may comprise data associated with a user (i.e., a user profile), including, but not limited to, a user identifier, one or more communication channel identifiers associated with communication channels to which the user has been granted access, one or more group identifiers for groups (or, organizations, teams, entities, or the like) with which the user is associated, an indication whether the user is an owner or manager of any communication channels, an indication whether the user has any communication channel restrictions, a plurality of messages, a plurality of emojis, a plurality of conversations, a plurality of conversation topics, an avatar, an email address, a real name (e.g., Alice Tyler), a username (e.g., alice_t), a password, user preferences and/or settings, a time zone, a status, a token, and the like.

In some examples, the datastore 128 may additionally or alternatively store permissions data associated with permissions of individual users of the communication platform. In some examples, permissions can be set by the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with an individual user can be mapped to, or otherwise associated with, an account or profile associated with the user data. In some examples, permissions can indicate which users can communicate directly with other users, which channels a user is permitted to access, restrictions on individual channels, which workspaces the user is permitted to access, restrictions on individual workspaces, and the like. In at least one example, the permissions can support the communication platform by maintaining security for limiting access to a defined group of users. In some examples, such users can be defined by common access credentials, group identifiers, or the like, as described above.

The datastore 128 may additionally or alternatively store workspace data, which may be part of the communication data 130. In at least one example, the communication platform can be partitioned into different workspaces, which can be associated with different groups of users. Each workspace can be associated with a group identifier and one or more user identifiers can be mapped to, or otherwise associated with, the group identifier. User(s) corresponding to such user identifier(s) can be "members" of the group. A workspace may comprise one or more channels that are unique to that workspace and/or one or more channels that are shared between one or more workspaces. In some examples, workspaces can be associated with one or more organization identifiers, which can be associated with organizations or other entities associated with the communication platform. In some examples, such data can be mapped to, or otherwise associated with, other types of data in the datastore 127 (e.g., user data, permission data, channel data,).

The datastore 128 may additionally or alternatively store channel data, which can be part of communication data 130. Channel data may store data associated with individual communication channels. In at least one example, the host communication application can establish a communication channel between and among various user computing devices, allowing the user computing devices to communicate and share data between and among each other. In at least one example, a communication channel identification may be assigned to a communication channel, which indicates the physical address in the datastore 128 where data related to that communication channel is stored. A communication channel may be "public," which may allow any user within an organization (e.g., associated with an organization identifier) to join and participate in the data sharing through the communication channel, or a communication channel may be "private," which may restrict data communications in the communication channel to certain users or users having particular roles (e.g., managers, administrators). In some examples, a communication channel may be "shared," which may allow users associated with different organizations (e.g., entities associated with different organization identifiers) to join and participate in the data sharing through the communication channel. Shared channels may be public such that they are accessible to any user of either organization, or they may be private such that they are restricted to access by certain users or users having particular roles from both organizations. In some embodiments, each organization may set different policies for data access and retention for its data in the shared channel.

In some examples, the datastore 128 may be partitioned into discrete items of data that may be accessed and managed individually (e.g., data shards). Data shards can simplify many technical tasks, such as data retention, unfurling (e.g., detecting that message contents include a link, crawling the link's metadata, and determining a uniform summary of the metadata), and integration settings. In some examples, data shards can be associated with organizations, groups (e.g., workspaces), communication channels, users, or the like. In some examples, data shards can improve the performance of the communication platform.

In some examples, individual organizations can be associated with a database shard within the datastore 128 that stores data related to a particular organization identification. For example, a database shard may store electronic communication data associated with members of a particular organization (i.e., communication data 130), which enables members of that particular organization to communicate and exchange data with other members of the same organization in real time or near-real time. In this example, the organization itself can be the owner of the database shard and has control over where and how the related data is stored. In some examples, a database shard can store data related to two or more organizations (e.g., as in a shared channel).

In some examples, a channel can be associated with a database shard within the datastore 128 that stores data related to a particular channel identification. For example, a database shard may store electronic communication data associated with the communication channel, which enables members of that particular channel to communicate and exchange data with other members of the same channel in real time or near-real time. In this example, a group or organization can be the owner of the database shard and can control where and how the related data is stored.

In various examples, the embedding component 126 may comprise an offline component for processing batches of (historical) communication data 130 and an online component for processing newly received communication data 130.

The offline component may process batch(es) of communication data that have been stored in the datastore 128 whereas the online component may process direct calls from the client communication application 118 to an API to make use of the embedding component 124 and may comprise data that may or may not end up being stared in the datastore 128, such as message drafts or queries. Upon instantiation of the techniques discussed herein, the embedding component 124 may run the offline component and retrieve communication data 130 associated with one or more previous time periods from datastore 128 and determine embeddings associated with the communication data 130, effectively creating a history of embedding(s) 132 and/or alignment(s) 134 associated with the communication data 130. At instantiation, this may comprise going back weeks, months, a year, years, and/or back to the inception of the organization's use of the communication platform to process the communication data 130 associated with the organization's use of the communication platform After instantiation, the offline component may regularly batch process communication data 130 that has newly been added to the datastore 128 and that wasn't processed due to an API call (e.g., using the API function). For example, the embedding component 126 may batch process communication data 130, generating embeddings for new communication data 130, on a nightly, weekly, or monthly basis. In some examples, the batch processing rate may depend on the communication data type—the content of channels may drift more quickly than the type of conversations an individual engages in so communication data 130 associated with a channel may be processed at a more frequent rate, such as on a daily versus a weekly basis.

Online and/or offline processing of communication data 130 by embedding component 124 may comprise making use of one or more ML model(s) 126, such as an image recognition model (e.g., for detecting the content of images and/or videos), natural language processing (NLP) models, file content classifiers, and/or the like. In some examples, the ML model(s) 126 may be used to generate tags and/or strings associated with different types of communication data 130 that may not otherwise contain a useful string or that may contain too much data. For example, the ML model(s) 126 may generate a description associated with an image, audio file, video, document, spreadsheet, computer code, and/or the like for use by the embedding component 124 in generating an embedding associated therewith. In some examples, the description may not be humanly comprehensible. For example, the ML model(s) 126 may output a tensor or vector to describe data. In additional or alternate examples, the ML model(s) 126 may transcribe, summarize, and/or extract salient data from the communication data 130 discussed herein.

The embedding component 124 may additionally or alternatively comprise an online component that receives calls via the API(s) 120 from computing device(s) 104. Such calls are described in more detail herein. For example, the client communication application 118 may make a call to the embedding component 124 when a user begins typing a new message or search query, when the user transmits a message or search query, when the user starts creating a new channel or workspace, when the user attaches a file to a message, when the user creates a ticket, when the user calls an application integrated into a channel, etc. The communication data generated by the user may be provided to the embedding component 124, which may determine an embedding associated with the (live) communication data received from the user, determine one or more nearest embeddings based at least in part on embeddings 132, and transmitting the results and/or instructions to the computing device(s) 104, as discussed in more detail herein. Regardless of whether the embedding component 124 generated an embedding online or offline, the embedding component 124 may store the embedding in the datastore 128 and retain the embedding until the associated communication data 130 is deleted from the datastore 128. The datastore 128 may associated an individual piece of communication data 130 with its respective embedding and, as may be applicable to some types of communication data 130, the alignment 134 associated therewith.

In some examples, the embedding component 124 may additionally or alternatively determine an alignment 134 associated with one or more types of communication data 130. This may comprise determining a density, distribution, or other degree of similarity of embeddings associated with a communication data type. For example, the embedding component 124 may determining an alignment of messages in a channel. In some examples, determining the alignment may be based at least in part on clustering embeddings and determining a number of clusters or a density of embeddings in the one or more clusters.

The embedding component 124 may comprise a preprocessing component, an embedding algorithm for generating embeddings, and/or a clustering algorithm for determining clusters of embeddings. In some examples, the preprocessing component may comprise a component for unfurling (e.g., detecting that message contents include a link, crawling the link's metadata, and determining a uniform summary of the metadata) and/or one or more of the ML model(s) 126, such as for generating embeddings for images, videos, audio, computer code, etc. In such an example, the ML model(s) 126 may comprise one or more neural network layers that function as one or more preprocessing layer before one or more embedding layers and/or, in some examples, the embedding algorithm may itself comprise one or more neural network layers. In some examples, unfurled data and/or ML model output data may be used as input to the embedding algorithm.

In various examples, the embedding algorithm may include a neural network layer that is learned jointly with a neural network model, Word2Vec, GloVe, t-distributed stochastic neighbor embedding (t-SNE), and/or the like. Communication data 130 may be used to supervise training of some of the models discussed herein in some examples. For example, direct user input that classifies or implicitly classifies or assigns a value to data may be used as part of training data for the models discussed herein. This input may comprise an image label, moderation operations (e.g., moving a conversation, message, user, etc. from one channel to a different channel; merging two channels; splitting a channel into two channels). The clustering algorithm may comprise any suitable clustering algorithm, such as k-means clustering, density-based spatial clustering of applications with noise (DBSCAN), HDBSCAN, mean-shift clustering, expectation-maximization (EM) clustering, etc. In some examples, the clustering algorithm may differ depending on the communication data type.

In some examples, the embeddings 132 and/or alignment(s) 134 may be associated with a retention window that may or may not match a retention window associated with communication data 130. Either of these retention windows may be set by an administrator of an organization's account or may be fixed based on a service level associated with the communication platform provisions to an organization.

In some examples, the communication platform server(s) 102 may include communication interface(s) 136 and/or computing device(s) 104 may include communication interface(s) 138. Communication interface(s) 136 and/or 138 may include one or more physical and/or logical interfaces, such as hardware and/or software components, for enabling communication with various other devices, such as over the network(s) 106 or directly. In some examples, the communication interface(s) 136 and/or 138 can facilitate communication via Websockets, Application Programming Interfaces (APIs) (e.g., using API calls), HyperText Transfer Protocols (HTTPs), etc. Additionally or alternatively the communication interface(s) 136 and/or 138 may enable Wi-Fi-based communication such as via frequencies defined by the IEEE 802.11 standards, short range wireless frequencies such as Bluetooth®, cellular communication (e.g., 2G, 2G, 4G, 4G LTE, 5G, etc.) or any suitable wired or wireless communications protocol that enables the respective computing device to interface with other computing device(s).

The communication platform server(s) 102 may further include input/output (I/O) device(s) 140 and/computing device(s) 104 may include I/O device(s) 142. Such I/O devices 140 and/or 142 can include a display, various user interface controls (e.g., buttons, a touch screen, keyboard, mouse, touch screen, joystick), audio speakers, connection ports, haptic or other tactile output devices, and so forth.

In some examples, individual user computing devices associated with the example system 100 can have an instance or versioned instance of the client communication application 118, which can be downloaded from an application store, accessible via the Internet, or otherwise executable by the processor(s) 112 to perform operations as described herein. That is, the application 118 can be an access point, enabling the user computing device(s) 104 to interact with the server(s) 102 to access and/or use communication services available via the communication platform, such as accessing the host communication application 116 and/or embedding component 124 via the API(s) 120. In at least one example, the client application 118 can facilitate the exchange of data between and among various other user computing devices, for example via the server(s) 102. In at least one example, the client communication application 118 may comprise instructions for causing presentation of a user interface 122, which may comprise visual, audible, and/or tactile features. A non-limiting visual representation of a general user interface 122 is illustrated in FIG. 1 More detailed user interface are illustrated in the following figures.

As illustrated in FIG. 1, the user interface 122 may present data associated with one or more communication channels and, in some examples, one or more workspaces. That is, in some examples, the user interface can expose features from multiple channels, workspaces, users, and/or applications into a single user interface so that the user (e.g., of the user computing device 104) can access and/or interact with these different features and/or communicate with other users associated with the different features. In some examples, the user interface 122 may comprise a first pane associated with a first region 146 of the interface that displays channels of which the user is a member and/or direct message channels with other user(s).

Additionally or alternatively, the user interface 122 may comprise a second region 148 of the user interface 122 that can be associated with a data feed (or, "feed") indicating messages posted to and/or actions taken with respect to one or more communication channels and/or other virtual spaces for facilitating communications (e.g., a virtual space associated with direct message communication(s), a virtual space associated with event(s) and/or action(s)). In some examples, the data feed can be organized and/or is sortable by workspace, time, type of action, communication channel, user, or the like. In some examples, such data can be associated with an indication of which user (e.g., member of the communication channel) posted the message and/or performed an action.

The user interface 122 may additionally or alternatively comprise an interface element (e.g., visual display element, such as a button) for drafting a message, i.e., element 150; creating a search query, i.e., element 152; and/or for creating a triage ticket, i.e., element 154. Note that, although these elements are depicted as visual elements, they may be selectable or interacted with via voice, touch, gaze, I/O device output, and/or other user interactions. The client communication application 118 may include instructions to display a message drafting interface, a search query interface, or a triage ticket interface upon selection of any of these interface elements. Interaction with any of these interfaces may create an API call that includes data that may be based at least in part on the interaction with the interface. This API call may be transmitted to communication platform server(s) 102 and may call functionality of the host communication application 116 and/or embedding component 124 via the API(s) 120. Note that although this application discusses using API calls, any other suitable method of transmitting data or a request for data and responding to such data/requests may be used, such as a publish-subscribe (pub-sub) architecture.

While FIG. 1 is provided as an example system 100 that can be used to implement techniques described herein, the techniques described and claimed are not limited to being performed by the system 100, nor is the system 100 limited to performing the techniques described herein.

Example API Calls and/or Responses

Figure 2:
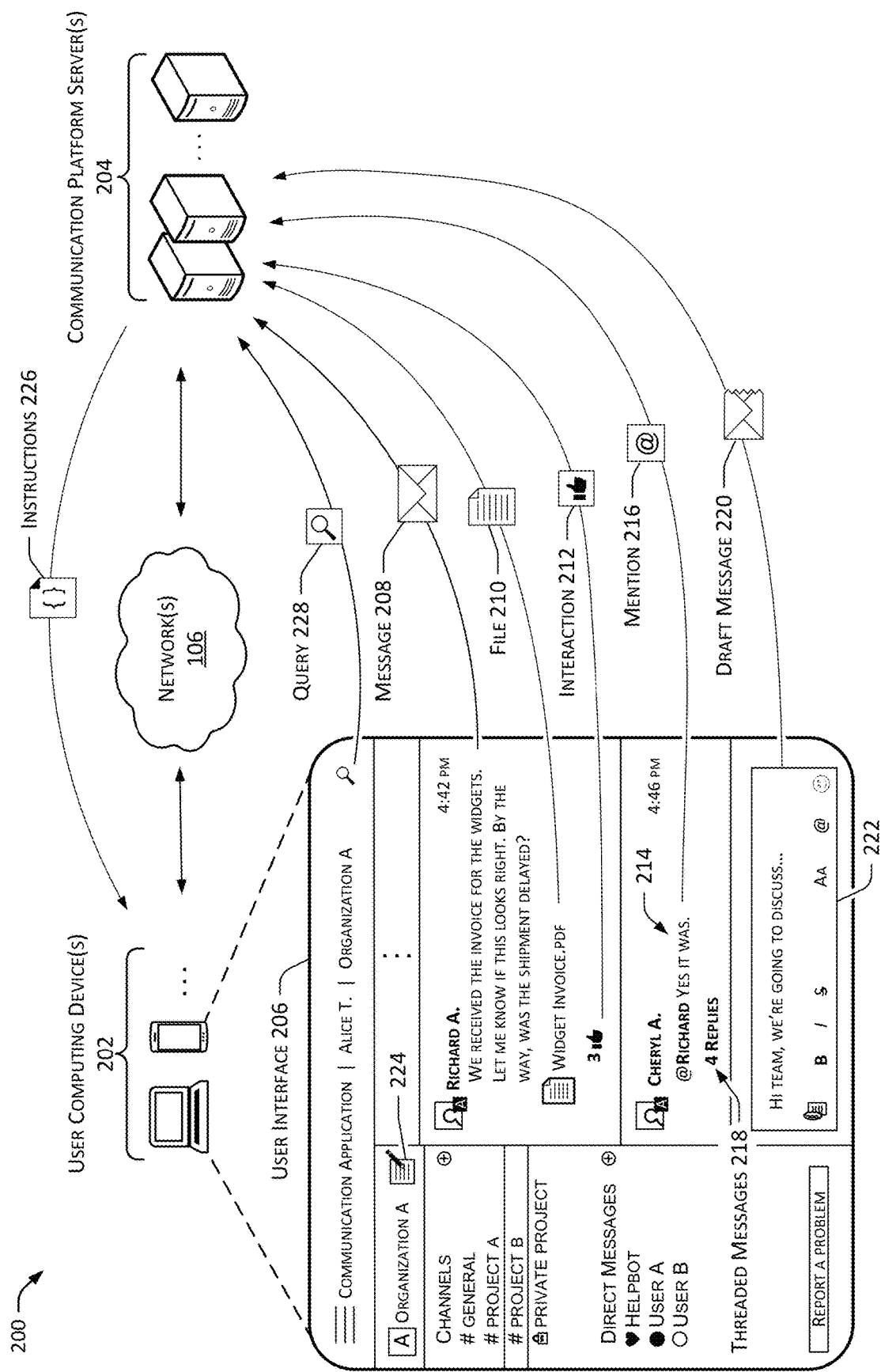
FIG. 2 is a block diagram illustrating example communication platform data that may be used to characterize communication platform features, according to the techniques discussed herein.

FIG. 2 is a schematic view of an example scenario 200 usable to implement the techniques described herein to generate embeddings associated with various communication data to expose features of a communication platform to a user in different example cases. The example cases may include, for example, enhancing results provided for a search query; exposing a user to mention or a channel or workspace in which to send a draft message; exposing an application that may be relevant to a message, query, or the like; moderating channel and/or workspace alignment by merging or splitting channels, migrating users, and/or suggesting meetings between two or more users; etc.

FIG. 2 generally depicts at least some of the communication data (e.g., communications, interactions, and/or content) that may be transmitted over a group-based communication platform and that may be used to generate embeddings. Example scenario 200 depicts user computing device(s) 202, which may represent computing device(s) 104, transmitting various communication data via network(s) 106 to communication platform server(s) 204, which may represent communication platform server(s) 102.

FIG. 2 also depicts a user interface 206 which may be displayed by one of the user computing device(s) 202 (e.g., by a client communication application 118 executed thereon). User interface 206 may display various communication data retrieved from the server(s) 204 in accordance with a user profile associated with Alice Tyler. The user interface 206 may display the communication data which Alice has created and/or is permitted to view and/or interact with, such as the channels that Alice has joined in a workspace associated with "Organization A." In particular, FIG. 2 depicts the data feed associated with the channel "Project B," which at least other two users (i.e., Richard A. and Cheryl A.) are members of.

The communication data represented by the user interface 206 may have been sent by one or more computing devices to communication platform server(s) 204. For example, the communication data received by the server(s) 204 may include a message 208 sent by Richard A. at 4:42 pm, a file 210 attached to that message, and/or interaction(s) 212 with the message 210. The message 208 may comprise text, metadata (e.g., time sent, time received, user identifier, channel identifier, workspace identifier, organization identifier), attachments such as files, links, and/or the like. Although file 210 is represented as a pdf, the file 210 could be any other type of file, such as a document, spreadsheet, computer code (e.g., batch file, executable, script, library, program, network packet capture, or the like). Moreover, although interaction 212 is depicted as a reaction (i.e., a "thumbs up" emoji in this case, although other reactions are contemplated), interactions may include edits to another piece of communication data, a deletion of communication data, and/or a prioritization or deprioritization of communication data (e.g., starring, pinning, archiving, assigning a retention window after which the communication data will be deleted).

FIG. 2 also depicts an example of a message 214, sent from Cheryl A., that includes a mention 216 of another user and which is associated with 4 threaded messages 218, indicated as "4 Replies" in the user interface 206. A mention 216 may include a user identifier, a channel identifier, an organization identifier, an application identifier, etc. although the depicted example only includes a user identifier. In some examples, applications integrated into the channel may be mentioned or called using a unique application call signal (e.g., a back-slash, a hyphen, an exclamation point).

Channel integration of an application may comprise giving API(s) of the application permissions to receive communication data sent over a channel or via direct message(s) to the application. This may allow the application to take actions outside of the communication platform and/or within the communication platform that are related to the communication data and/or responsive to commands embedded in the communication data within the communication platform. For example, the application may comprise software-as-a-service (SaaS) or other cloud-based services, a local application running on the user computing device, or the like. In some examples, data that includes a mention of an application may be transmitted to and/or stored at the server(s) in addition to transmitting the data to the application integrated into the communication platform.

The communication data may additionally or alternatively include a command; a command may be a specialized message sent via a channel or direct message that includes a command identifier, which may be symbol such as a forward slash, exclamation point, tilde, or the like. The symbol may be used to provide a shortcut for performing specific operations via the client communication application and/or identify a message and/or file as being intended for an API of the host communication application and/or an application integrated into the communication platform. In some instances, the symbol may differ depending on the feature to which the command is to be provided and, in some examples, the command may. Commands may additionally or alternatively address a bot A threaded message, such as one of the threaded messages 218, may be a message with a unique thread identifier that identifies a parent message and that may be formatted, represented, and/or stored differently than other messages. For example, in the illustrated example, the threaded messages 218 are nested as part of the message 214 and may be displayed upon selection.

The communication data may additionally or alternatively include a draft message 220 generated based at least in part on input associated with an element of the user interface 206 for capturing text, voice, image, and/or video input from the user, such as the text box 222 associated with the "Project B" channel or the compose message icon 224, which upon selection may open a dialog that is not associated with a channel. In the illustrated example, Alice has begun to type a message in the text box 222, which may trigger transmission of an API call and a draft message 220 including the text Alice has entered so far to be sent to the server(s) 204. The API call may also open a streaming connection between the user computing device and the server(s) 204 so that further data entered into the user interface 206 by Alice may be transmitted to the server(s) 204, in real-time or near real-time, and instructions 226 may be relayed back to the user computing device form the server(s) 204 based on the techniques discussed herein. For example, the instructions 226 may comprise results of the techniques discussed herein and/or instructions for providing new user interface options for exercising selectable control over operations of the client communication application 118 and/or interactions of the client communication application 118 with the server(s) 204.

The communication data may additionally or alternatively include a query 228, which may comprise text, audio, etc. input by the user to discover a feature of the communication platform. In some examples, the techniques discussed herein may provide real-time or near real-time search results based on semantic similarity of one or more types of communication data. The communication data may additionally or alternatively comprise a triage ticket that may include text describing a problem, a ticket identifier, screenshots and/or video, etc. Tickets may be received from an integrated application or from an entry submitted by the user via a specialized user interface associated with tickets. Submitting a ticket may cause an incident channel to be opened associated with the ticket, the user that submitted the ticket, and one or more users of a department associated with providing assistance with tickets of a type identified by the ticket.

In some examples, the server(s) 204 may receive any of the communication data discussed above and may conduct one or more of the operations as discussed herein. The server(s) 204 may transmit instructions 226, which may comprise instructions for displaying results of the techniques discussed herein, causing the client communication application to perform an action, or providing a user with a selectable control (e.g., a selectable control for adding a mention of a user, associating a message with a channel, splitting a channel, merging channels, migrating a channel, migrating a user).

Figure 3:
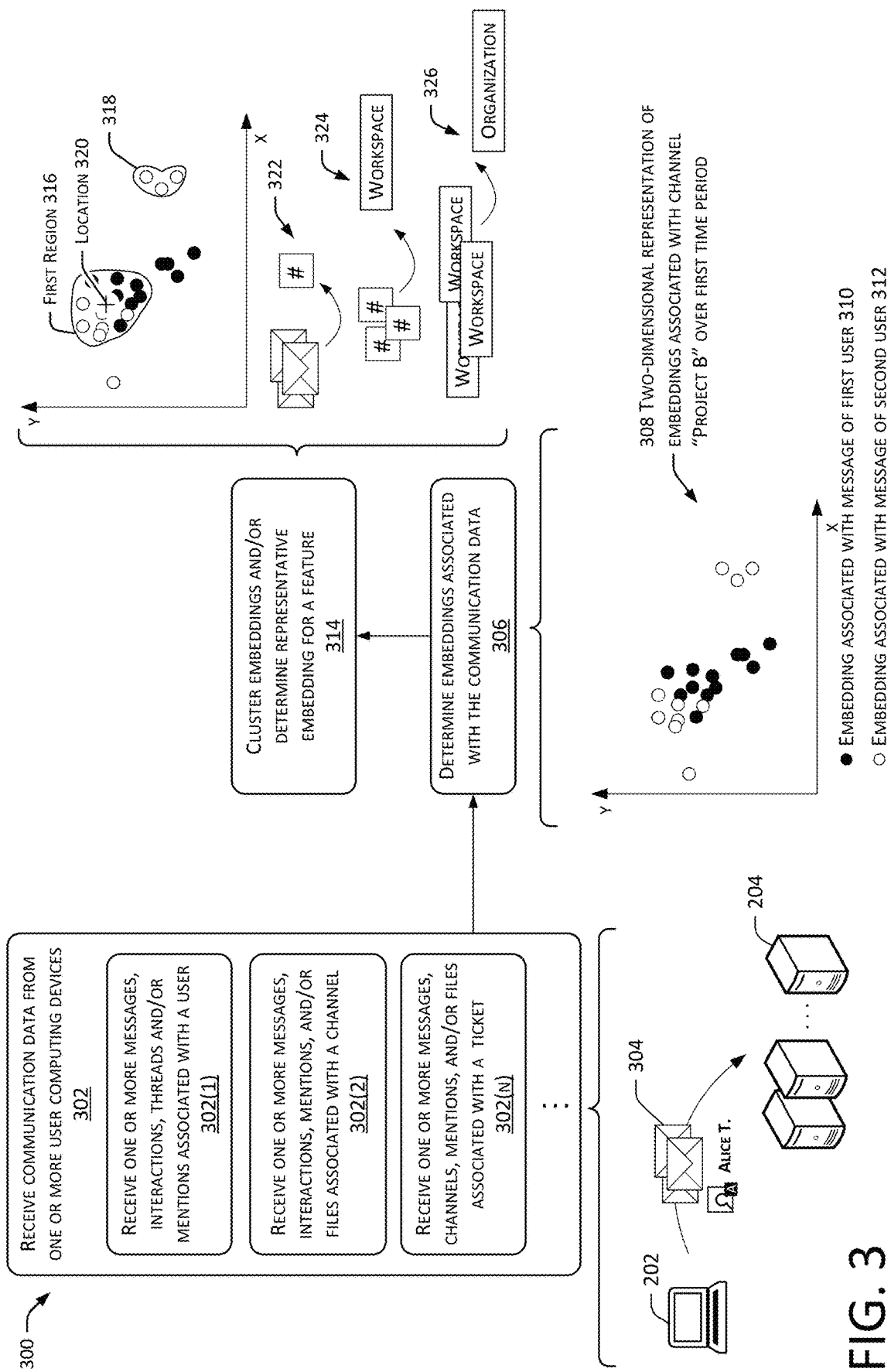
FIG. 3 illustrates an example process for generating embeddings associated with different communication data and associating the embeddings with different types of communication data.

Example Processes for Embedding Creation, Feature Characterization, and Uses Thereof FIG. 3 depicts a flow diagram of an example process 300 for generating embeddings associated with different communication data and associating the embeddings with different types of communication data. In various examples, example process 300 may be carried out by communication platform server(s) 204, although in some examples user computing device(s) 202 may provide or receive at least some of the data and instructions discussed and/or may perform one or more of the operations instances where the processing is partially or completely distributed to user computing devices.

At operation 302, example process 300 may include receiving communication data from one or more user computing devices, according to any of the techniques discussed herein. In some examples, operation 302 may be conducted in real-time or substantially real-time. In other words, the server(s) 204 may receive the communication data as it is created and/or transmitted by a user computing device or close-in-time thereto. In an additional or alternate example, operation 302 may be part of a batch processing operation conducted by an embedding component. For example, the embedding component may receive the communication data based at least in part on requesting the communication from the data store as part of offline generation of a batch of embeddings for those portions of communication data associated with a time period (e.g., the last day, the last week, the last month). In some instances, such batch generation may merely sample communication data of different types to generate the embeddings although in other examples all of the communication data may have an embedding generated and associated therewith.

In some examples, the communication data may be received or retrieved in association with a particular communication platform feature, such as a user profile (operation 302(1)), a channel (operation 302(2)), a ticket (operation (302(n)), or the like. For example, operation 302 may comprise (302(1)) receiving or retrieving one or more messages, interactions, threads, and/or mentions associated with a user; (302(2)) receiving or retrieving one or more messages, interactions, mentions, and/or files associated with a channel; (302(n)) receiving one or more messages, channels, mentions, and/or files associated with a ticket; and/or the like. FIG. 3 depicts a simple illustration of receiving messages 304 from a user computing device 202 sent by Alice T. In an additional or alternate example, the associations between portions of communication data may be represented in a graph (e.g., a directed graph, a directed acyclic graph), table, metadata associated with a portion, and/or the like. For example, a message may be associated with a user that sent the message, a channel over which the message was sent, one or more interactions by one or more users, etc. The relationships between the communication data may be associated with the embeddings in a same, similar, or different manner as those relationships are indicated by the communication data itself.

At operation 306, example process 300 may include determining, by an embedding algorithm, embeddings associated with the communication data, according to any of the techniques discussed herein. As discussed above, this may be part of either an online or an offline process. In some examples, determining an embedding associated with communication data may differ based on the type of communication data. For example, links and/or files may require one or more steps of pre-processing in some instances, such as unfurling a link, conducting natural language processing or image recognition, classifying and/or summarizing content, identifying salient or key portions, etc. These pre-processing steps may be accomplished by deterministic and/or ML algorithms. In some instances, a type of the communication data may be included as part of the input data to the embedding algorithm. For example, input data to the embedding algorithm for generating an embedding associated with a triage ticket may include text associated with the ticket, a classification generated by an ML model based on a screenshot provided with the ticket, and label associated with tickets, such as "HelpDesk" or some other term with semantic significance and that may be unique that communication data significant to help steer the embedding toward a region of the embedding space.

In some examples, the embedding may be a tensor, vector, and/or the like and may comprise many dimensions (e.g. 4 dimensions, 32 dimensions, 64 dimensions, 256 dimensions, 514 dimensions, 1024 dimensions, although more or less dimensions are contemplated). For simplicity, FIG. 3 depicts a two-dimensional representation of embeddings that were generated in association with channel "Project B" over a first time period. To depict the embeddings in two-dimensions the embeddings may be projected form the embedding space to the two-dimensional space. The depiction includes embeddings associated with messages sent by a first user 310, depicted as filled circles; and embeddings associated with messages sent by a second user 312, depicted as unfilled circles.

The following paragraphs give extended examples of the example process 300 for different types of communication data.

The embedding algorithm may determine an embedding associated with a message based at least in part on the message text and/or a context associated with the message text. For example, the context may comprise one or more messages in a same conversation, threaded messages associated with the message (e.g., the threaded message identifies the message as its parent or the threaded message and the message both identify a same other message as a parent), one or more messages sent within a same time period, a set number of messages that precede the instance message, or the like. In some examples, emojis and/or special characters may be removed from the message text.

The embedding algorithm may determine an embedding associated with a user based at least in part on removing nonce words or symbols contained in the query (e.g., question mark, articles, interrogative words) and embedding the remaining text. In some examples, an interrogative word may be used to weight how the results are ranked. For example, if the query contained the word "who," the server may weight results associated with users higher in a ranking for presenting an order of the results; or if the query contained the word "where," the server may weight results associated with channels or workspaces higher.

At operation 314, example process 300 may include clustering embeddings and/or determining a representative embedding for a feature of the communication platform, according to any of the techniques discussed herein. Determining a cluster of embeddings may include determining embeddings that are similar, form a recognizably associated pattern (e.g., colloquially, a human would say embeddings in the cluster look clumped or related). Operation 314 may differ depending on the type of communication data for which an embedding or representative embedding is being generated. In the depicted example, example process 300 may comprise determining a representative embedding to associated with a channel. To do so, operation 314 may comprise clustering the embeddings (e.g., in the embedding space, although FIG. 3 depicts the regions of the clusters in two dimensions) and determining a location or region of the embedding space to associate with the channel. For example, FIG. 3 depicts a first region 316 associated with a first cluster and a second region 318 associated with a second cluster. Practically, this may mean that the communication data represented by the embeddings associated with the first region 316 may share a semantic meaning and/or may be similar for a latent reason and the communication data represented by the embeddings associated with the second region 318 may be different than the communication data associated with the embeddings of the first region 316 but may be similar to one another.

In instances where operation 314 results in detecting multiple clusters, operation 314 may output multiple representative embeddings (e.g., a representative embedding per cluster, a representative embedding per top ranked p clusters where p is a positive integer) or a single representative embedding (e.g., associated with a top ranked cluster). Operation 314 may comprise determining a number, destiny, and/or variance of embeddings in each cluster and may rank the clusters according to greatest number, density, variance or a combination thereof. In some examples, the representative embedding associated with a communication feature, such as a user, channel, message, etc., may be a mean or median location of a cluster, a center determined by the clustering algorithm, the region associated with the cluster, and/or a reduced region associated with the cluster (e.g., a shape defined by the region and reduced in size by a factor, e.g., 0.8, 0.5, any other factor). For example, operation 314 may result in associating the first region 316 (or a reduced version thereof) and/or the location 320 indicated by the crosshairs with the channel.

In some examples, operation 314 may comprise clustering embeddings and/or determining a representative embedding to associate with a feature based at least in part on relationships between the data. For example, a representative embedding associated with a(n)

channel may be based at least in part on the embedding(s) generated for one or more messages sent in the channel (in some cases may be limited to the message(s) that are most recent, most interacted with (e.g., most reactions, prioritization, most threaded messages), most responded to), a role associated with a user of the channel, or the like;

conversation may be based at least in part on the embedding(s) of one or more messages that have been segmented as being associated with a same conversation the segmenting may be determined by an ML model based at least in part on a time between messages, a user mention, message threads, and/or interactions with a message by users that also transmit another message (see U.S. patent application Ser. No. 16/523,647, filed Jul. 26, 2019, and entitled "Method, Apparatus, and Computer Program Product for Categorizing Multiple Group-Based Communication Messages," the entirety of which is incorporated herein—the techniques described therein may comprise a pre-processing step before generating an embedding in the instant application);

user may be based at least in part on the embedding(s) of the messages sent by the user, embeddings of messages to which the user interacted, threaded messages sent by the user, messages in a conversation in which a message sent by the user appears, and/or messages mentioning the user (except global or channel-wide mentions);

file may be based at least in part on an embedding of a message associated with uploading the file, an unfurling result, an ML model output (e.g., a tag, summary, classification), or the like;

application may be based at least in part on the embedding(s) of an application description, message context where the application was called, a file provided to or received from the application, a channel embedding for a channel with which the application is associated;

workspace may be based at least in part on the embedding(s) of the channel(s) and/or user(s) associated with the workspace; and/or organization may be based at least in part on the embedding(s) of the workspace(s) associated with the organization.

FIG. 3 depicts a simplified representation of amalgamating message embeddings to determine a representative embedding for a channel (322, e.g., where the messages are associated with the channel), amalgamating channel representative embeddings to determine a representative embedding for a workspace (324, e.g., where the channels are associated with the workspace), and amalgamating workspace representative embeddings to determine a representative embedding for an organization (326, e.g., where the workspaces are associated with the organization).

Note that, although the discussion contained herein refers to determining an embedding or a representative embedding associated with a particular type of communication type, the techniques may additionally or alternatively comprise determining multiple embeddings and/or representative embeddings associated with communication data. For example, the techniques may comprise associating multiple embeddings with any of the communication data types discussed herein wherein the multiple embeddings are different based at least in part on being produced by different embedding algorithms, being produced by a same embedding algorithm with different parameterizations (e.g., two embeddings produced by a same embedding algorithm but using different parameters to generate the two embeddings), being associated with different clusters (e.g., clustering embeddings associated with a user or channel results in multiple clusters), being generated in association with different times (e.g., first embedding(s) associated with a first time frame, second embedding(s) associated with a second time frame), and/or the like.

Figure 4:
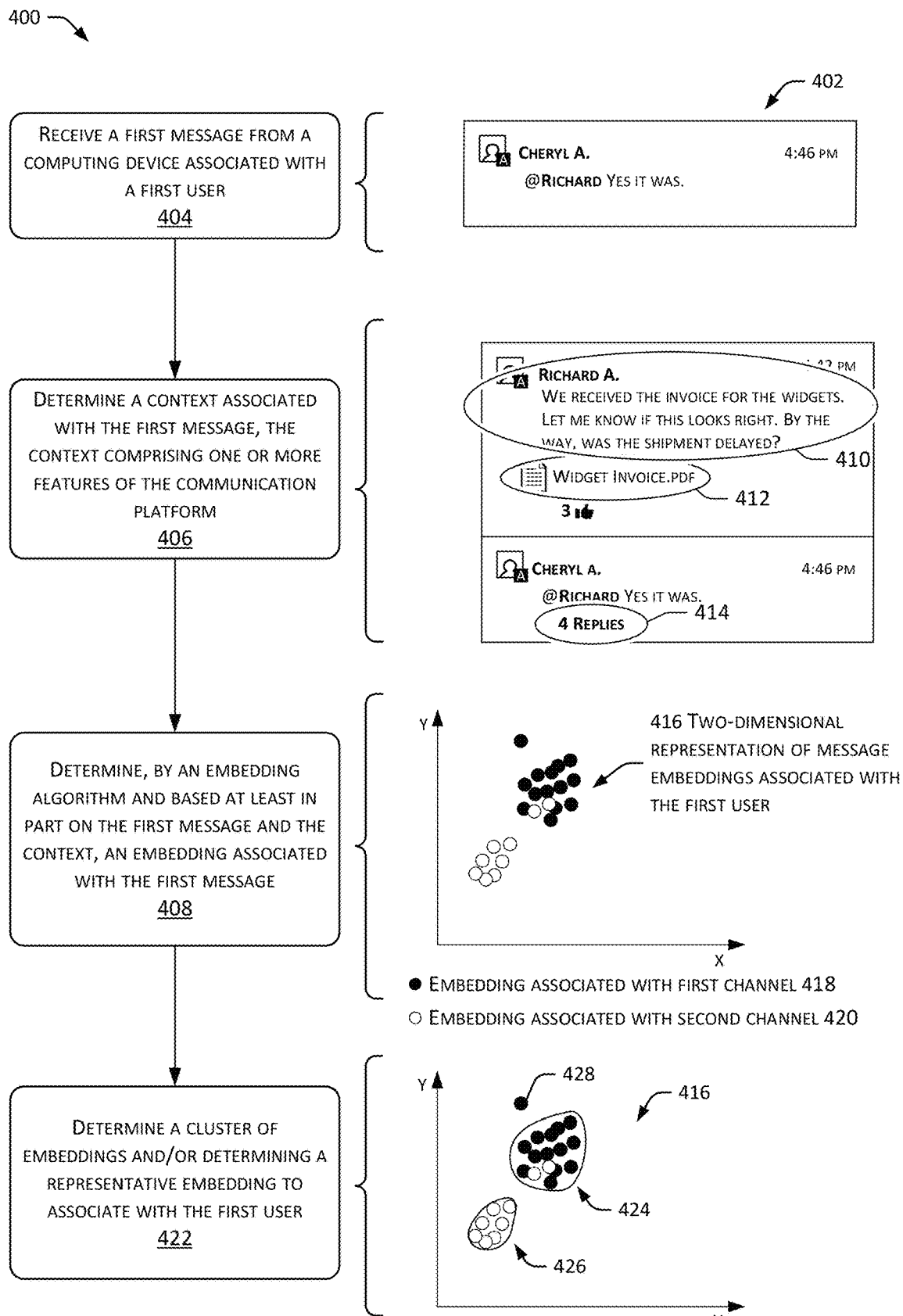
FIG. 4 illustrates an example process for characterizing a user's interaction with a communication platform.

FIG. 4 depicts a flow diagram of an example process 400 for characterizing a user and/or the user's interaction with a communication platform. In some examples, example process 400 may be an example of example process 300 as relates specifically to a user, in order to further illustrate the concepts discussed herein. In various examples, example process 400 may be carried out by communication platform server(s) 204, although in some examples user computing device(s) 202 may provide or receive at least some of the data and instructions discussed and/or may perform one or more of the operations instances where the processing is partially or completely distributed to user computing devices.

The example scenario discussed in association with FIG. 4 further details the solutions for the difficulties of creating an embedding associated with a user. Namely, although a user may be an active participant on a communication platform, that user's communication data may lack semantic significance. For example, in the illustrated example, a user named Cheryl transmitted a message 402 containing the text "Yes it was" and mentions a second user, Richard. "Yes it was" contains little to no topical meaning, as the words could be associated with almost any topic.

At operation 402, example process 400 may include receiving a first message or message draft from a computing device associated with a first user, such as message 402. In an example where the server(s) 204 transmits real-time or near-real-time results or instructions to the user computing device the first message may be accompanied by an API call to the embedding software. In some examples and from the perspective of the user computing device, sending the message, receiving instructions to open the message composition dialog (e.g., which may lack association with a channel) and receiving data associated therewith, receiving instructions to open a search dialog and receiving a query associated therewith, drafting a message associated with a channel, receiving instructions to open a ticket, etc. may trigger the API call and may cause the first computing device to send at least a fragment of data associated with the action that triggered the API call. For example, the data fragment may comprise words detected as being salient for embedding, e.g., based at least in part on removing nonce words or symbols and/or words having low semantic significance from data entered so far. In some examples, the operations conducted herein may be conducted using the data fragment.

At operation 406, example process 400 may include determining a context associated with the first message, the context comprising one or more features of the communication platform, according to any of the techniques discussed herein. Operation 406 may be a pre-processing step for generating an embedding for the first message. It is understood that, in many cases, messages may be more robust semantically than the example message 402 and may be embedded without conducting such a pre-processing operation. In some examples, the first message may be provided to an ML model trained to score a semantic significance of the first message. If the score meets or exceeds a threshold score, the example process 400 may continue from operation 404 to operation 408, skipping operation 406. If the score does not meet the threshold score, the example process 400 may transition from operation 404 to operation 406.

Determining the context may comprise determining whether the first message is associated with one or more second messages based at least in part on a conversation segmentation, whether the first user interacted with a message that was sent within the last q number of messages in the channel (where q is a positive integer), an identity of one or more users that interacted with the first message and/or an identity of a user that sent a message within a time frame before or after the first message was sent, whether the first message mentions another user, or the like. In the depicted example, Cheryl's message 402 mentions Richard, who sent the previous message 410. The previous message 410 and/or data associated therewith, such as the file 412, or embeddings associated therewith may be used as part of the context or embeddings associated therewith. Moreover, in the depicted example, there are 4 threaded messages 414 associated with the first message that may be used as part of the context. In some examples, any of this communication data (e.g., previous message 410, file 412, threaded messages 414) may be checked for semantic significance using the ML model discussed above (e.g., by generating scores associated with each and determining whether the scores meet or exceed the threshold score).

At operation 408, example process 400 may include determining, by an embedding algorithm and based at least in part on the first message and/or the context, an embedding associated with the first message and/or the first user, according to any of the techniques discussed herein. For example, this may comprise embedding at least one of the first message and/or communication data included as part of the context. For example, the contextual communication data may replace the first message or be concatenated to the first message. In an additional or alternate example, an embedding may have already been generated for one or some of the communication data of the context. In such an example, a representative embedding may be determined from among the embeddings generated in association with the first message and for the contextual data.

Regardless, operation 408 may result in an embedding that may be associated with the first message. Since the first message may relationally be associated with the first user that sent the message and the channel to which the message was posted, the embedding generated by operation 408 may be used as part of the embeddings for determining a representative embedding associated with the first user or a representative embedding associated with the channel. For example, FIG. 4 depicts a two-dimensional representation 416 of embeddings associated with the first user with embeddings associated with the user's use of a first channel depicted as filled circles (418) and embeddings associated with the user's use of a second channel depicted as unfilled circles (420).

At operation 422, example process 400 may include determining a cluster embeddings based at least in part on embeddings associated with the first user and/or determining a representative embedding to associated with the first user based at least in part on the embeddings associated with the first user, according to any of the techniques discussed herein. For example, applying the clustering algorithm to the embeddings depicted in the two-dimensional representation 416 may result in two clusters, 424 and 426. In some examples, multiple representative embeddings may be associated with the user and/or metadata associated with the user. For example, a first representative embedding associated with the user's use of the first channel may be determined based at least in part on embeddings of the cluster 424 based at least in part on determining that the cluster is composed primarily of embeddings associated with the first channel. Similarly, a second representative embedding associated with the user's use of the second channel based at least in part on embeddings of the cluster 426. Additional or alternative metadata which the representative embeddings may be associated or based upon which the representative embeddings may be based may include a role associated with a role, a workspace, etc.

Cluster 424 predominantly includes embeddings associated with the user's interactions with the first channel 418, but also includes two embeddings associated with the second channel. This means that the user has predominantly or exclusively used the first channel to discuss related topic(s) in the first channel, but the user has used the second channel, at times, to discuss topics related to the first channel in the second channel. In other words, the fact that cluster 424 predominantly includes embeddings associated with the first channel and only two embeddings associated with the second means that the user may use the second channel, at times, to transmit content and/or communications that are more relevant to the communication data in the first channel. Since no embeddings associated with the first channel 418 appear in the second cluster 426, which is entirely composed of embeddings associated with the second channel, the second channel appears to include communication data that is related/not off-topic. The embedding 428 that is not included in either cluster indicates that the user transmitted a message that does not fit in the usual topics that the user discusses. Since that embedding is also associated with the first channel, with which the cluster 424 is associated, the message may have been an off-topic message in the first channel or may be associated with a topic that another user addresses more frequently, as in the case where a single channel develops multiple topics/clusters.

Example Processes for Enhanced Message Drafts and/or Search Queries

Figure 5:
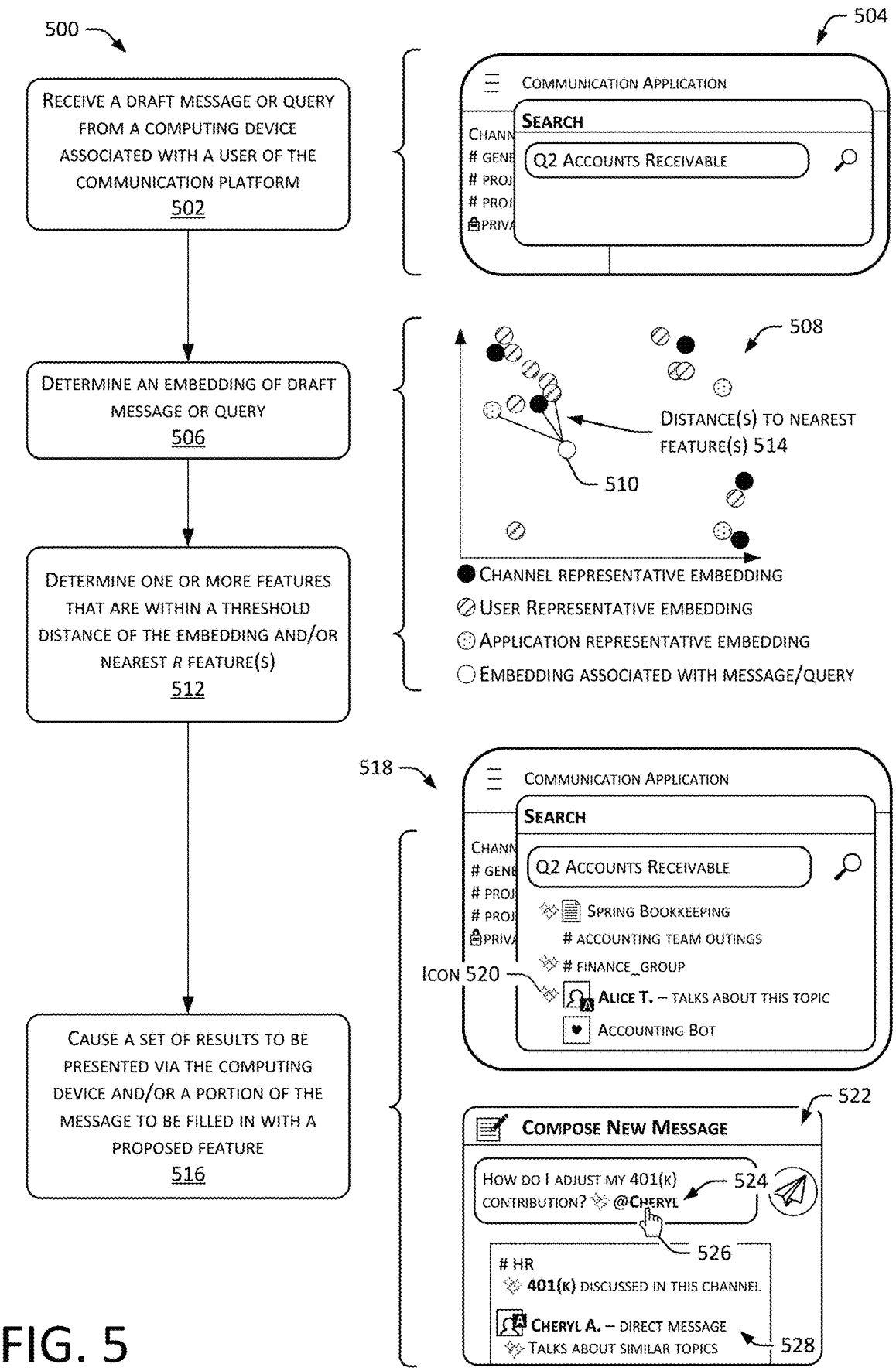
FIG. 5 illustrates an example process for enhancing a draft message or search results using the embedding techniques discussed herein.

FIG. 5 depicts a flow diagram of an example process 500 for enhancing a draft message or search results using the embedding techniques discussed herein. In various examples, example process 500 may be carried out by communication platform server(s) 204, although in some examples user computing device(s) 202 may provide or receive at least some of the data and instructions discussed and/or may perform one or more of the operations instances where the processing is partially or completely distributed to user computing devices.

At operation 502, example process 500 may include receiving a draft message or query from a computing device associated with a user of the communication platform, according to any of the techniques discussed herein. For example, the draft message or query may be received in association with an API call to the embedding component that was triggered based at least in part on the user beginning to input or transmitting a message or query. FIG. 5 depicts an example user interface 504 associated with generating a search query. In the depicted example, a user has entered the text string "Q2 Accounts Receivable." Operation 502 may comprise removing nonce words or symbols or semantically insignificant words from the search query, which may not be necessary in the depicted example. In an example where a draft message is received, the draft message may or may not be associated with a channel or target user already (e.g., the user to which the message will be sent in a direct message example, a user that will be mentioned in the message).

At operation 506, example process 500 may include determining an embedding of the draft message or query, according to any of the techniques discussed herein. For example, FIG. 5 depicts a two-dimensional representation 508 of embeddings associated with a variety of types of communication data, the two-dimensional representation including the embedding 510 associated with the draft message or query.

At operation 512, example process 500 may include determining one or more features that are within a threshold distance of the embedding and/or the nearest r number of feature(s) (where r is a positive integer), according to any of the techniques discussed herein. In at least one example, operation 512 may be performed in whole or in part by a nearest neighbor algorithm, such as k-nearest neighbor (k-NN), approximate nearest neighbor (ANN), BallTree, KDTree, or the like. In some instances, operation 512 may be limited to determining the one or more features based on embeddings associated with communication data of one or more types. The one or more types may be restricted or down-weighted according to a search filter or based at least in part on a keyword, such as "who" or "where." Ultimately, operation 512 may be designed to identify one or more features of the communication platform that may be related to the draft message or query.

At operation 516, example process 500 may include causing a set of results to be presented via the user computing device a portion of the message to be filled in with a proposed feature, according to any of the techniques discussed herein. In an example where operation 504 comprises receiving a query, operation 516 may comprise transmitting one or more of the r features as at least part of the search results for presentation at the user computing device. For example, the results may be intermingled with results generated by a different method of searching the communication platform. FIG. 5 depicts a user interface 518 displaying an intermingled set of results, where results determined based at least in part on operation 512 are indicated in association with an icon 520. In some examples, notation elsewhere in the user interface may indicate that the icon 520 is associated with potentially semantically related features.

For example, operation 516 may additionally or alternatively comprise determining and/or display metadata associated with a result. The metadata may be based at least in part on data associated with an embedding associated with the result, a type of the communication data upon which the result is based, and/or communication data associated with the result. In the illustrated example, a message or the channel #HR may be associated with an embedding that was determined at operation 512. Determining the metadata may comprise determining a cluster label associated with a cluster containing the embedding determined at operation 512. For example, the cluster may identify one or more embeddings as being associated with "401(k)." In such an example, operation 516 may comprise displaying icon 520 and/or metadata to indicate that the result may be semantically related to the draft message or query. In the illustrated example, this includes indicating "401(k) discussed in this channel."

To give another example, operation 512 may result in identifying an embedding associated with a user. In such an instance, the metadata may indicate that the user may have provided semantically relevant communication data, regardless of whether such communication data literally matches the query or draft messages or not. In an additional or alternate example, the metadata may be displayed in association with one or more recommended methods of communicating with a second user. For example, the metadata may be displayed in association with a recommendation to initiate a communication with a user (e.g., start a voice and/or video call with the user, open a direct message to the user, transmit a draft and/or completed message to the user), transmit a draft message over a channel, join a channel, join a workspace, attach or download a file, invoke an application.

Ultimately, the icon 520 and/or metadata associated with the results may indicate that the features found by operation 512 and displayed by operation 516 may be semantically related to the query and/or draft message, even if such a result does not match. To give further examples of the metadata that may be determined in association with different communication platform features, the metadata may indicate the feature itself and/or data related thereto. For example, operation 512 may identify a file. Determining the metadata may comprise determining that a user is associated with the file (e.g., the user uploaded the file). In such an example, operation 516 may additionally or alternatively comprise displaying metadata associated with the communication feature type of the result and/or of data associated therewith (e.g., "User x has posted a file regarding 401(k)s," "User x has posted a file that may be relevant").

Further examples of metadata associated with different types of communication features may include "Discussed in this channel" in association with a result comprising a channel; "Talks about [search term]" in association with a result comprising a user, bot, or application; "May help with [search term]" in association with a result comprising a bot or application; etc.

Operation 516 may additionally or alternatively comprise determining a ranking of the intermingled results for commingled display or may display the search results generated by a different method separately. Note that, in the depicted example, the other method may find communication data that matches terms more closely, i.e., "accounting team outings" and "accounting bot" both contain the term "account," as does the query, but these results may not be helpful since they may not semantically align as closely with the query. In the depicted example, a document titled "Spring Bookkeeping" that does not match terms with the query has been returned as the communication data having a closest embedding, followed by a channel titled "Finance_group" and an indication of the user Alice (and an indication that Alice may talk about the topic that is the subject of the query).

In an example where the same string, "Q2 accounts receivable" was the beginning of a draft message, although the document "Spring Bookkeeping" may be associated with a closest embedding, files may be down-weighted in a ranking in comparison to channels and users, which may be more likely to be useful for sending a message. FIG. 5 depicts a second user interface 522 that may be associated with composing a new message, which may not yet be associated with a channel or a user. In the depicted example, the user may be unfamiliar with the appropriate channel to post a 401(k) question in or who to contact with such a question. In this example, the nearest neighbor search may identify a user, Cheryl, and/or a channel, #HR, as two of the features having closest embeddings of the string "How do I adjust my 401(k) contribution?" Operation 516 may comprise transmitting instructions to display at least part of the results of operation 512 and/or to cause an actionable control for causing the draft message to be associated with or transmitted to one of the results. For example, in the depicted example, operation 516 may result in auto-filling a mention 524 of Cheryl to the new message, which may be accepted or rejected based on user input 526 (e.g., a touch-screen gesture, a selectable element displaying "Keep?" or similar prompts, a key input) and/or displaying one or more results 528 that may cause the message to be associated with a channel, as in the case of the channel result, #HR, and/or open a direct message conversation with an individual. In some examples, multiple actionable controls may be used in combination, such as keeping the mention of Cheryl and associating the message with the channel #HR in the depicted example.

Example Processes for Determining Alignment and Action Triggers Related Thereto

Figure 6:
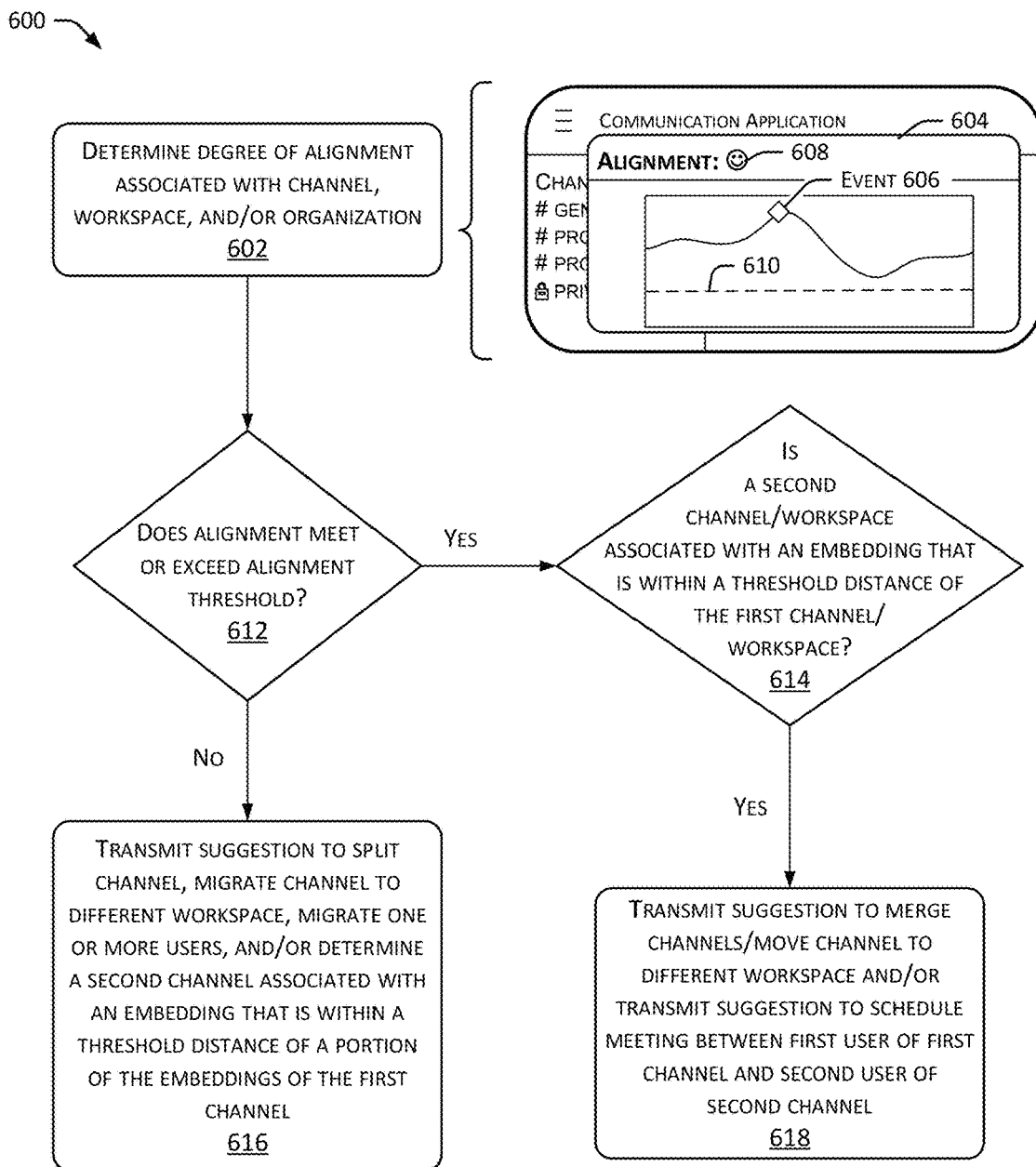
FIG. 6 illustrates an example process for determining an alignment associated with a communication platform feature and various communication platform moderation actions based on the alignment.

FIG. 6 depicts a flow diagram of an example process 600 for determining a degree of alignment associated with one or more communication platform features and various communication platform moderation actions based on the degree of alignment. In various examples, example process 600 may be carried out by communication platform server(s) 204, although in some examples user computing device(s) 202 may provide or receive at least some of the data and instructions discussed and/or may perform one or more of the operations instances where the processing is partially or completely distributed to user computing devices.

At operation 602, example process 600 may include determining a degree of alignment associated with a channel, workspace, and/or organization based at least in part on embeddings associated therewith, according to any of the techniques discussed herein. For example, determining the degree of alignment for a feature may comprise determining a density of, variance between, a distribution of, and/or an average distance between embeddings associated with the feature, or the like. In some examples, determining the degree of alignment may be based at least in part on a number of clusters determined in association with the channel—the degree of alignment may be decreased as the number of clusters increases and/or the number of clusters over a threshold number (e.g., 2, 3, 4, other numbers) increases. In some examples, the degree of alignment may be regressed by an ML model trained to output the degree of alignment. Operation 602 may comprise a pre-processing step to remove outlier embedding(s), small clusters (e.g., a cluster having a number of embeddings below a predefined number), and/or embedding(s) or small clusters that are associated with a time in the past that exceeds a threshold amount of time (e.g., more than 3 months old, 1 month old, 1 week old). Regardless, the degree of alignment may be an indication of the continuity of the communication data associated with the feature and/or the consistency with which the users interacting with the feature use it for the same purposes. In some examples, the alignment may additionally or alternatively be based at least in part on a difference between a channel structure (e.g., a hierarchy between channels and/or workspaces, membership of channels) and an organizational chart.

In some examples, the degree of alignment may be determined for embeddings associated with a feature and a first time period and the degree of alignment may be determined at regular intervals. This alignment data may be stored in association with a channel, workspace, and/or organization and displayed via the user interface, such as depicted in FIG. 6 at 604. In some instances, permissions to view the alignment may be limited to organization managers, channel owners, etc. The user interfaces associated with the users with the correct permissions may display an icon for retrieving and displaying the alignment over time associated with a channel, workspace, and/or organization (depending on the user's permissions). Additionally or alternatively, major events, such as a reorganization of an organization; product releases; software updates rolled out by the organization associated with the communication platform or not; announcements; a business merger or acquisition; a channel or workspace merger, split, or migration; or the like may be associated or displayed with the alignment. For example, event 606 may have been a business merger that caused a temporary drop in the degree of alignment of the channel, workspace, or organization depicted in FIG. 6 as new employees joined the communication platform in association with the organization. In some examples, determining the alignment may be triggered by a reorganization or an edit to an organizational chart and/or the reorganization and/or organization chart edit may appear as an event 606. The alignment display may additionally or alternatively display an indication 608 of whether the degree of alignment is satisfactory, which may be defined as being a degree of alignment that meets or exceeds a threshold degree of alignment 610, depicted as a dashed line in the alignment display 604.

At operation 612, example process 600 may include determining whether the alignment meets or exceeds an alignment threshold, according to any of the techniques discussed herein. If the degree of alignment meets or exceeds the alignment threshold, example process 600 may transition to operation 614, otherwise example process 600 may transition to operation 616.

At operation 614, example process 600 may include determining whether a second channel/workspace is associated with an embedding that is within a threshold distance of the first channel/workspace, according to any of the techniques discussed herein. In some examples, operation 614 may comprise a nearest neighbor search for a representative embedding associated with a channel or workspace that is nearest to the representative embedding associated with the first channel or workspace. If that nearest neighbor is within a threshold distance, example process 600 may transition to operation 618, otherwise example process 600 may store the alignment determined above. In at least one example, the threshold distance may be one of one or more criteria for satisfying a determination of whether first communication data is similar to second communication data.

At operation 618, example process 600 may include transmitting a suggestion to merge the first channel and the second channel, to move a first channel to a second workspace, and/or to schedule a meeting between at least a first user of the first channel and a second user of the second channel, according to any of the techniques discussed herein. In some examples, operation 618 may additionally or alternatively be based at least in part on a pattern and/or a rate of change of a distance between features. For example, the actions described herein may not take place the first time it is detected that two features' embeddings have reached a threshold distance of each other, although that may be the case in some examples. In other examples, the actions included in operation 618 may be triggered based at least in part on determining that the embeddings associated with the features have been within a threshold distance of each other for a threshold amount of time (e.g., after a week, a month), the distance between the features demonstrates an average trend of decreasing, or the like. In some examples, upon detecting that two features are within the threshold distance, the time period between alignment determinations for each of the features may be decreased to more closely monitor whether the separate features are becoming aligned over time.

Operation 618 may comprise transmitting instructions to a first computing device associated with a first user that is associated with elevated permissions for the first channel/workspace (e.g., a channel/workspace manager), the instructions causing display of a suggestion to merge the first channel with the second channel, display of a preview of the suggested channel merger, and/or an actionable control to transmit a confirmation or denial of the merger. If the first user denies the merger no further action is taken, but if the first user selects the confirmation a message may be transmitted to a second user associated with the second channel. The second user may also have elevated permissions and may accept or deny the channel merger.

Upon acceptance of the merger, the two channels may be merged into a single channel, which may comprise archiving the former two channels, adding the members of the two channels to a single new channel with no history, adding the members of the two channels to a single new channel with an interleaved (e.g., the new channel includes communication data from both former channels and is interleaved based on conversation segment, time, or the like) and/or a history of priority data (e.g., the new channel only includes the communication data from the two former channels that was prioritized or most interacted with), or the like.

Operation 618 may additionally or alternatively comprise similar techniques of providing actionable controls to the responsible users for moving a first channel to a second workspace based at least in part on determining that a distance between the first channel and a first workspace is greater than a distance between the first channel and the second workspace.

Operation 616 may additionally or alternatively include transmitting a draft meeting between at least a first user of the first channel/workspace and a second user of the second channel/workspace based at least in part on determining that the distance between the first channel/workspace and the second channel/workspace is less than the threshold, has remained the distance threshold for a threshold time period, and/or continues to decrease with time. For example, the first user and/or the second user may be managers responsible for a team of employees and/or the first user and/or the second user may be users of the respective features that are associated with embeddings that are the closest among the embeddings of the two features. In some examples, the draft meeting may comprise an option to set a date or may propose a date—the user may confirm or deny the draft meeting. As with the other operations above, upon receiving a confirmation by one user, an indication of the confirmation may be transmitted to the other user. The meeting may be scheduled upon confirmation by one or both users and/or one or more members of the different channels/workspaces may be invited to the meeting based at least in part on data associated with the confirmation or automatically based at least in part on the distance of embeddings associated therewith.

Returning to operation 616 (e.g., poor alignment prong), example process 600 may include transmitting a suggestion and/or actionable control to split a channel, migrate a channel to a different workspace, migrate one or more users or messages, according to any of the techniques discussed herein. Operation 616 may comprise transmitting an instruction to a user's computing device to display a warning regarding the degree of alignment of the channel, a suggestion to split the channel, and/or an actionable control to cause the channel to split, which may be denied or affirmed. Upon receiving affirmation of the actionable control to split the channel, two new channels may be created from the former channel, which may be archived or deleted. In some examples, splitting the channel may comprise determining at least two clusters associated with a former channel and users and/or messages associated with each cluster. In at least one example, users may overlap, resulting in some users being added to both new channels, but messages may not, unless the message was prioritized or was one of the most interacted with messaged. A new channel may be populated with messages and users associated with a first cluster of embeddings.

In some examples, a user may inadvertently join and participate in a channel while looking for the appropriate channel. In such an instance (e.g., where a user has been a member of a channel for less than a threshold amount of time and/or the user has sent less than a threshold number of messages in the channel) operation 616 may comprise migrating the user and/or a message to a different channel that is associated with an embedding that is within a threshold distance of the message. As with the other examples above, this migration may be caused by exposing an actionable control to cause the migration at the user interface of a user with appropriate permissions (e.g., permissions above a permissions threshold, such as permissions associated with a manager or moderator).

Operations 616 and 618 may additionally or alternatively comprise notifying users associated with a channel of the channel/workplace modifications and may provide a selectable control to leave the new channel or to prevent a former channel from being deleted or archived.

Example Embeddings Associated with a Channel

Figure 7A:
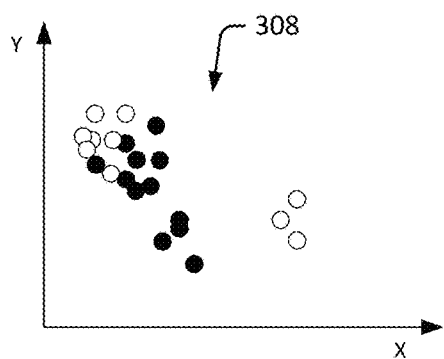
FIGS. 7A and 7B illustrate example two-dimensional representations of embeddings associated with messages sent by two different users via a channel over a first time period.
Figure 7B:
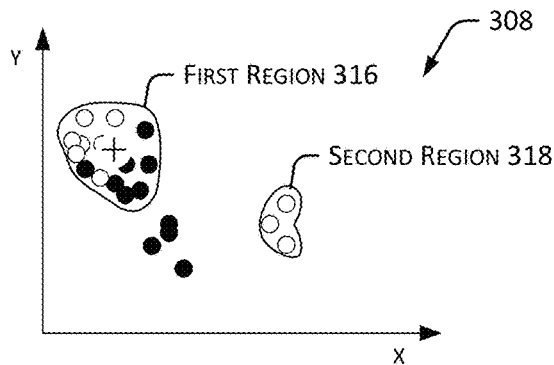

FIGS. 7A and 7B duplicate the illustration of the two-dimensional representation 308 of embeddings associated with messages sent by two different users via a channel over a first time period, as depicted in FIG. 3. FIG. 7B additionally illustrates clusters determined based thereon. These figures have been duplicated to facilitate comparison with FIGS. 7C-7E.

Figure 7C:
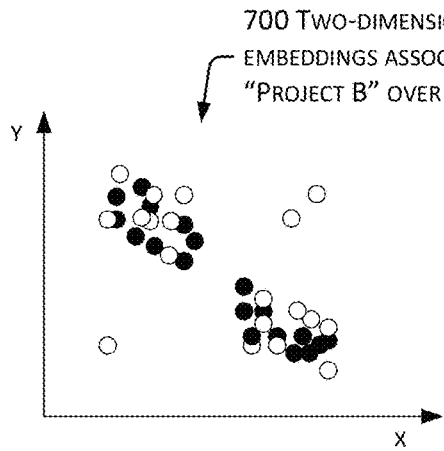
FIGS. 7C and 7D illustrate example two-dimensional representations of embeddings associated with messages sent by two different users via the same channel over a second time period.
Figure 7D:
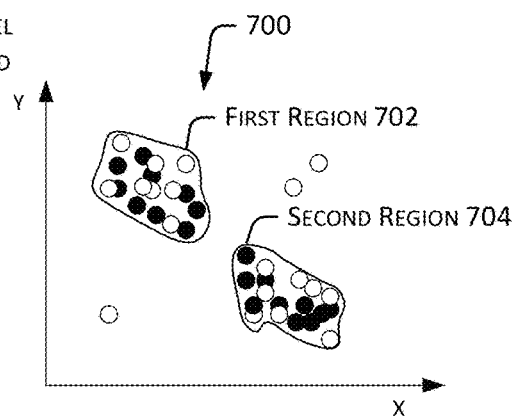

FIGS. 7C and 7D illustrate an example two-dimensional representation 700 of embeddings associated with messages sent by the same two different users via the same channel over a second time period. FIG. 7D additionally illustrates clusters determined based on the embeddings represented at 700—a first cluster 702 and a second cluster 704. Note that by determining that the embeddings associated with the channel include two clusters, the communication and/or content associated with the channel may be diverging, which may decrease the degree of alignment associated with the channel.

Figure 7E:
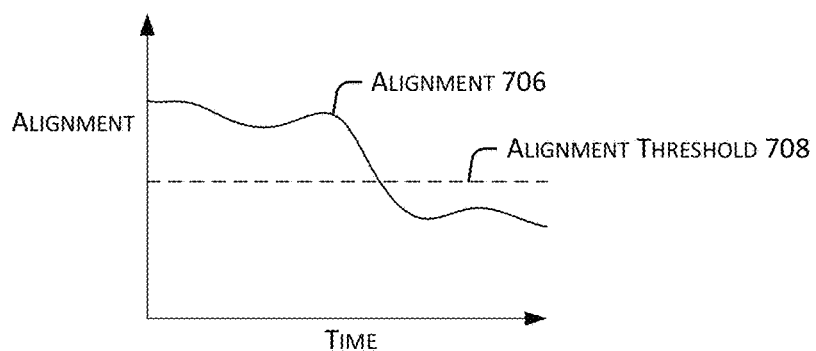
FIG. 7E illustrates a graph of the alignment associated with the channel discussed in FIGS. 7A-7D and an alignment threshold that may be used to trigger one or more actions by the communication platform server(s), such as transmitting instructions to notify a user and/or to expose an actionable control for modifying the communication platform.

FIG. 7E illustrates a graph of the alignment 706 associated with the channel discussed in FIGS. 7A-7D over time and an alignment threshold 708 that may be used to trigger one or more actions by the communication platform server(s), such as transmitting instructions to notify a user and/or to expose an actionable control for modifying the communication, as discussed in more detail regarding FIG. 6.

Example Processes for Enhanced Ticket Triage

Figure 8:
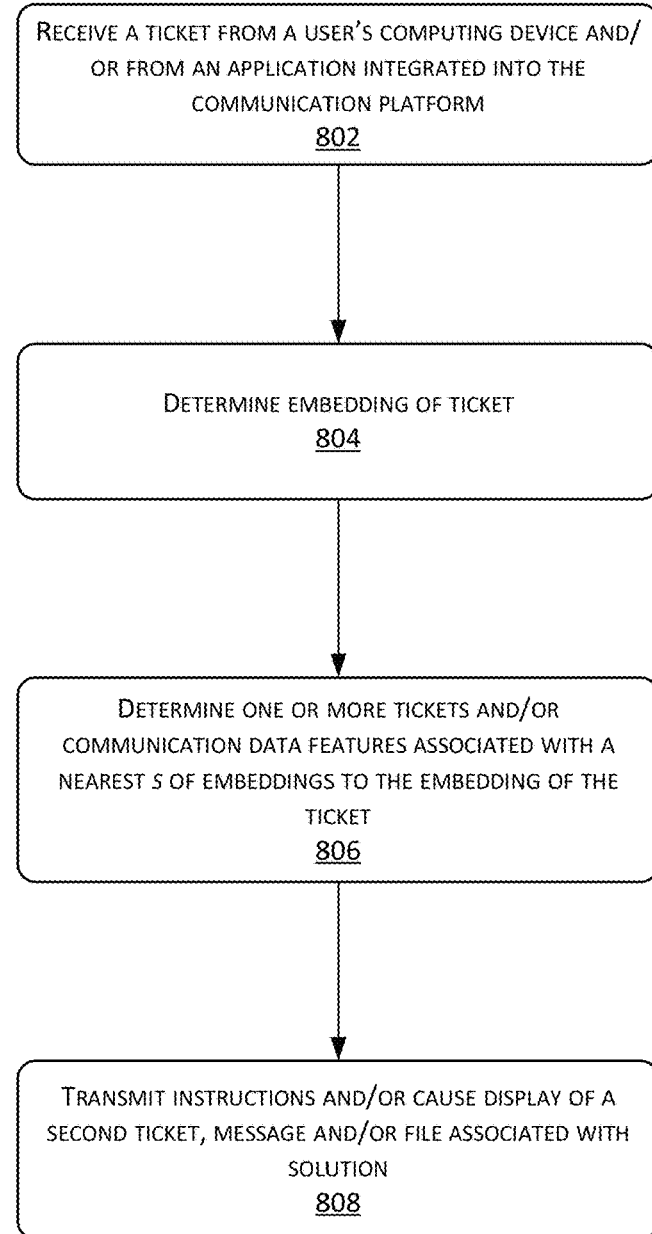
FIG. 8 illustrates an example process for enhancing a ticket triage process using the embedding techniques discussed herein.

FIG. 8 depicts a flow diagram of an example process 800 for enhancing a ticket triage process using the embedding techniques discussed herein. In various examples, example process 800 may be carried out by communication platform server(s) 204, although in some examples user computing device(s) 202 may provide or receive at least some of the data and instructions discussed and/or may perform one or more of the operations instances where the processing is partially or completely distributed to user computing devices.

At operation 802, example process 800 may include receiving a ticket from a user's computing device and/or from an application integrated into the communication platform, according to any of the techniques discussed herein. For example, the ticket may be generated based at least in part on input provided to an issue resolution component of the client communication application. In an additional or alternate example, an application specifically designed for triaging technical or other issues, such as a SaaS application, may provide the ticket to the communication platform server(s). In some examples, the communication platform may create a new channel in association with the new ticket and/or the new ticket may be added to a channel based at least in part on a category indicated by the ticket. In some examples, the ticket may comprise text describing a problem, an image and/or video depicting the problem, a machine state or machine data associated with a machine failure, computer code, a network packet capture, or the like.

At operation 804, example process 800 may include determining an embedding of the ticket and/or data associated therewith, according to any of the techniques discussed herein. Operation 804 may comprise classifying, by an ML model, an image and/or video to generate a text label or summary and/or concatenating some of the additional data to the text associated with the ticket.

At operation 806, example process 800 may include determining one or more tickets and/or communication data features associated with a nearest s embeddings (where s is a positive integer), according to any of the techniques discussed herein. Operation 806 may be accomplished by a nearest neighbor algorithm and/or by determining one or more embeddings within a threshold distance of the ticket's embedding. In some examples, the results may be limited to a workspace and/or channels identified as triage features and/or to other tickets or solutions thereto.

At operation 808, example process 800 may include transmitting instructions to a user's computing device associated with the ticket and/or causing display of a second ticket, message, and/or a file associated with a solution based at least in part on the distance between the ticket embedding and the embeddings of the results of operation 806, according to any of the techniques discussed herein. In some examples, operation 806 may additionally or alternatively include merge or otherwise associate multiple tickets based at least in part on the distance(s) between embeddings associated with the tickets. For example, a same issue may recur and at least some of the alignment operations discussed regarding example process 500 may be used to address multiple tickets in a same channel or workspace. In some examples, determining to merge two triage channels and/or associate two tickets may trigger execution of a remediation process, which may comprise pushing an update to computing devices associated with the tickets (e.g., an update to the client communication application, a modification to an application integration, an update to an application stored on the user computing device, an update to plugins stored on the user computing device), executing a subroutine for funneling new tickets to the new channel, relaxing the distance threshold for a time period (e.g., if there is a surge of tickets), direct-messaging creators of the tickets with information to remediate an issue.

CONCLUSION

Although the discussion above sets forth example implementations of the described techniques, other architectures may be used to implement the described functionality and are intended to be within the scope of this disclosure. Furthermore, although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

What is claimed is:

1. A method, implemented at least in part by a server computing device associated with a communication platform, comprising:
   receiving a first message from a first computing device associated with a first user, the first message being associated with a first channel of the communication platform;
   determining, based at least in part on the first channel, a context associated with the first message, the context comprising one or more messages associated with at least one of the first user or another user;
   determining, by the server and based at least in part on the first message and the context, a first embedding;
   associating the first embedding with at least one of the first user or the first channel;
   receiving at least a portion of a second message from a second computing device associated with a second user;
   determining, by the server, a second embedding associated with at least the portion of the second message;
   determining that a distance between the first embedding and the second embedding is less than a threshold; and
   in response to a determination that the distance between the first embedding and the second embedding satisfies a threshold distance criterion, causing the second computing device associated with the second user to display one or more recommended methods of communicating with the first user.

2. The method of claim 1, wherein causing display of the one or more recommended methods of communicating with the first user comprises an option to cause the second computing device to at least one of:

include the first user as a recipient of the second message, mention the first user in the second message, add the first user to a second channel associated with the second user, initiate an audio call, video call, or instant messaging session with at least the first user, or associate the second message with an existing conversation associated with the first user.

3. The method of claim 1, wherein determining the context comprises determining at least one of:

a first set of messages in a thread associated with the first message;

a second set of messages associated with the first channel that were sent within a predetermined time of the first message; or one or more interactions associated with the first message, the first set of messages, or the second set of messages.

4. The method of claim 1, wherein determining the context comprises determining one or more interactions associated with the first message, the one or more interactions comprising at least one of:

associating a reaction with the first message, editing the first message, prioritizing the first message, or deprioritizing the first message.

5. The method of claim 1, further comprising causing display of metadata in association with the one or more recommended methods of communicating with the first user, the metadata indicating that the first user has transmitted communication data that is semantically related to at least the portion of the second message.

6. The method of claim 1, further comprising associating multiple representative embeddings with the first user, wherein:

a first representative embedding of the multiple representative embeddings is associated with the first user based at least in part on a first set of embeddings associated with at least one of the first channel, a first workspace, or a first role associated with the first user;

a second representative embedding of the multiple representative embeddings is associated with the first user based at least in part on a second set of embeddings associated with at least one of a second channel, a second workspace, or a second role associated with the first user; and causing the second computing device to display the one or more recommended methods of communicating with the first user is based at least in part on a first distance between the second embedding and the first representative embedding and a second distance between the second embedding and the second representative embedding.

7. The method of claim 6, wherein causing the second computing device to display the one or more methods of communicating with the first user is based at least in part on at least one of the first channel, the first workspace, or the first role.

8. A system comprising:

one or more processors;

a memory storing processor-executable instructions that, when executed by the one or more processors, cause the system to perform operations comprising:

receiving a first message from a first computing device associated with a first user;

determining a context associated with the first message, the context comprising one or more messages associated with at least one of the first user or another user;

determining, based at least in part on the first message and the context, a first embedding;

associating the first embedding with at least one of the first user or a first channel;

receiving at least a portion of a second message from a second computing device associated with a second user;

determining a second embedding associated with at least the portion of the second message; and in response to a determination that a distance between the first embedding and the second embedding satisfies a threshold distance criterion, causing the second computing device associated with the second user to display one or more recommended methods of communicating with the first user.

9. The system of claim 8, wherein the at least a portion of the second message is a message draft or a draft query.

10. The system of claim 8, wherein causing display of the one or more recommended methods of communicating with the first user comprises an option to cause the second computing device to at least one of:

include the first user as a recipient of the second message, mention the first user in the second message, add the first user to a second channel associated with the second user, initiate an audio call, video call, or instant messaging session with at least the first user, or associate the second message with an existing conversation associated with the first user.

11. The system of claim 8, wherein determining the context comprises determining at least one of:

a first set of messages in a thread associated with the first message;

a second set of messages associated with the first channel that were sent within a predetermined time of the first message; or one or more interactions associated with the first message, the first set of messages, or the second set of messages.

12. The system of claim 8, wherein the operations further comprise causing display of metadata in association with the one or more recommended methods of communicating with the first user, the metadata indicating that the first user has transmitted communication data that is semantically related to at least the portion of the second message.

13. The system of claim 8, wherein the operations further comprise associating multiple representative embeddings with the first user, wherein:

a first representative embedding of the multiple representative embeddings is associated with the first user based at least in part on a first set of embeddings associated with at least one of the first channel, a first workspace, or a first role associated with the first user;

a second representative embedding of the multiple representative embeddings is associated with the first user based at least in part on a second set of embeddings associated with at least one of a second channel, a second workspace, or a second role associated with the first user; and causing the second computing device to display the one or more recommended methods of communicating with the first user is based at least in part on a first distance between the second embedding and the first representative embedding and a second distance between the second embedding and the second representative embedding.

14. A non-transitory computer-readable medium storing processor-executable instructions that, when executed by one or more processors, cause the one or more processors to perform operations comprising:

receiving a first message from a first computing device associated with a first user;

determining a context associated with the first message, the context comprising one or more messages associated with at least one of the first user or another user;

determining, based at least in part on the first message and the context, a first embedding;

associating the first embedding with at least one of the first user or a first channel;

receiving at least a portion of a second message from a second computing device associated with a second user;

determining a second embedding associated with at least the portion of the second message; and in response to a determination that a distance between the first embedding and the second embedding satisfies a threshold distance criterion, causing the second computing device associated with the second user to display one or more recommended methods of communicating with the first user.

15. The non-transitory computer-readable medium of claim 14, wherein the at least a portion of the second message is a message draft or a draft query.

16. The non-transitory computer-readable medium of claim 14, wherein causing display of the one or more recommended methods of communicating with the first user comprises an option to cause the second computing device to at least one of:

include the first user as a recipient of the second message, mention the first user in the second message, add the first user to a second channel associated with the second user, initiate an audio call, video call, or instant messaging session with at least the first user, or associate the second message with an existing conversation associated with the first user.

17. The non-transitory computer-readable medium of claim 14, wherein determining the context comprises determining at least one of:

a first set of messages in a thread associated with the first message;

a second set of messages associated with the first channel that were sent within a predetermined time of the first message; or one or more interactions associated with the first message, the first set of messages, or the second set of messages.

18. The non-transitory computer-readable medium of claim 14, wherein determining the context comprises determining one or more interactions associated with the first message, the one or more interactions comprising at least one of:

associating a reaction with the first message,
editing the first message,
prioritizing the first message, or
deprioritizing the first message.

19. The non-transitory computer-readable medium of claim 14, wherein the operations further comprise causing display of metadata in association with the one or more recommended methods of communicating with the first user, the metadata indicating that the first user has transmitted communication data that is semantically related to at least the portion of the second message.

20. The non-transitory computer-readable medium of claim 14, wherein the operations further comprise associating multiple representative embeddings with the first user, wherein:

a first representative embedding of the multiple representative embeddings is associated with the first user based at least in part on a first set of embeddings associated with at least one of the first channel, a first workspace, or a first role associated with the first user;

a second representative embedding of the multiple representative embeddings is associated with the first user based at least in part on a second set of embeddings associated with at least one of a second channel, a second workspace, or a second role associated with the first user; and causing the second computing device to display the one or more recommended methods of communicating with the first user is based at least in part on a first distance between the second embedding and the first representative embedding and a second distance between the second embedding and the second representative embedding.

* * * * *